United States Patent
Alex et al.

(10) Patent No.: US 9,558,043 B2
(45) Date of Patent: Jan. 31, 2017

(54) SYSTEM AND METHOD FOR ABSTRACTING AND ORCHESTRATING MOBILE DATA NETWORKS IN A NETWORK ENVIRONMENT

(71) Applicants: Arun C. Alex, Nashua, NH (US); Rajesh P. Velandy, Nashua, NH (US); Pradeep K. Dakshayani Raghavan, Hudson, NH (US); Xiangfu Chen, Westborough, MA (US); Vijay Gaur, Secaucus, NJ (US); Wenxing Zheng, Westford, MA (US)

(72) Inventors: Arun C. Alex, Nashua, NH (US); Rajesh P. Velandy, Nashua, NH (US); Pradeep K. Dakshayani Raghavan, Hudson, NH (US); Xiangfu Chen, Westborough, MA (US); Vijay Gaur, Secaucus, NJ (US); Wenxing Zheng, Westford, MA (US)

(73) Assignee: CISCO TECHNOLOGY INC., San Jose, CA (US)

( * ) Notice: Subject to any disclaimer, the term of this patent is extended or adjusted under 35 U.S.C. 154(b) by 147 days.

(21) Appl. No.: 13/750,835

(22) Filed: Jan. 25, 2013

(65) Prior Publication Data
US 2014/0214914 A1 Jul. 31, 2014

(51) Int. Cl.
*H04L 29/08* (2006.01)
*G06F 9/50* (2006.01)

(52) U.S. Cl.
CPC .................. *G06F 9/5033* (2013.01)

(58) Field of Classification Search
CPC .... H04L 67/10; H04L 67/02; H04L 29/08135; H04L 67/1097; H04L 41/50; H04L 47/00
USPC ......................................................... 709/221
See application file for complete search history.

(56) References Cited

U.S. PATENT DOCUMENTS

| 6,128,279 | A | * | 10/2000 | O'Neil et al. | 370/229 |
| 8,249,361 | B1 | * | 8/2012 | Steffens | G06K 9/6203 382/118 |
| 9,270,709 | B2 | | 2/2016 | Shatzkamer et al. | |
| 9,414,215 | B2 | | 8/2016 | Shatzkamer et al. | |

(Continued)

FOREIGN PATENT DOCUMENTS

| CN | 104053142 A | 9/2014 |
| CN | 104284324 A | 1/2015 |

(Continued)

OTHER PUBLICATIONS

Cisco Systems, Inc., "Cisco Policy and Charging Control Solution with Cisco Intelligent Policy Control Function," At-A-Glance, May 2011, 2 pages; http://www.cisco.com/en/US/solutions/collateral/ns341/ns973/at_a_glance_c45-665213.pdf.

(Continued)

*Primary Examiner* — Moustafa M Meky
*Assistant Examiner* — Elizabeth Kassa
(74) *Attorney, Agent, or Firm* — Patent Capital Group

(57) ABSTRACT

A method is provided in one example and includes receiving data from a network element, determining a candidate data processing task for the received data based upon a first similarity metric between the received data and data currently associated with the candidate data processing task, and sending the received data to the candidate data processing task.

17 Claims, 16 Drawing Sheets

(56) References Cited

U.S. PATENT DOCUMENTS

| | | | |
|---|---|---|---|
| 2003/0014518 A1* | 1/2003 | Richard | H04L 12/24 |
| | | | 709/224 |
| 2003/0236087 A1 | 12/2003 | Stenton | |
| 2004/0001498 A1* | 1/2004 | Chen et al. | 370/401 |
| 2004/0156495 A1 | 8/2004 | Chava | |
| 2004/0172559 A1 | 9/2004 | Luo | |
| 2004/0193582 A1* | 9/2004 | Smyth | G06F 17/30533 |
| 2004/0205767 A1* | 10/2004 | Partanen | G06F 9/4843 |
| | | | 719/312 |
| 2004/0221038 A1* | 11/2004 | Clarke et al. | 709/226 |
| 2005/0228878 A1* | 10/2005 | Anstey | H04L 43/16 |
| | | | 709/224 |
| 2007/0036145 A1 | 2/2007 | Riley et al. | |
| 2007/0250630 A1 | 10/2007 | Blanding et al. | |
| 2008/0222646 A1* | 9/2008 | Sigal et al. | 718/105 |
| 2010/0027663 A1* | 2/2010 | Dai | H04N 19/159 |
| | | | 375/240.16 |
| 2010/0036956 A1* | 2/2010 | Nishikawa | G06F 9/505 |
| | | | 709/226 |
| 2010/0153454 A1* | 6/2010 | Rehm et al. | 707/791 |
| 2010/0205436 A1 | 8/2010 | Pezeshki | |
| 2011/0158090 A1 | 6/2011 | Riley et al. | |
| 2011/0258246 A1* | 10/2011 | Khandekar et al. | 709/201 |
| 2011/0302414 A1 | 12/2011 | Logan | |
| 2012/0052866 A1 | 3/2012 | Froehlich et al. | |
| 2012/0054755 A1* | 3/2012 | Evans | G06Q 10/06 |
| | | | 718/102 |
| 2012/0099429 A1 | 4/2012 | Ludwig | |
| 2012/0110145 A1 | 5/2012 | Pinheiro | |
| 2012/0110462 A1 | 5/2012 | Eswaran et al. | |
| 2012/0155389 A1 | 6/2012 | McNamee | |
| 2012/0239792 A1* | 9/2012 | Banerjee | H04L 67/1097 |
| | | | 709/223 |
| 2012/0281540 A1 | 11/2012 | Khan | |
| 2012/0303425 A1 | 11/2012 | Katzin et al. | |
| 2013/0035060 A1 | 2/2013 | Chan | |
| 2013/0176975 A1 | 7/2013 | Turanyi | |
| 2013/0183995 A1 | 7/2013 | Smith | |
| 2013/0189982 A1 | 7/2013 | Baluja | |
| 2013/0295921 A1 | 11/2013 | Bhargava | |
| 2014/0067728 A1* | 3/2014 | Ogren | G06F 17/30569 |
| | | | 706/12 |
| 2014/0113628 A1 | 4/2014 | Sundararajan | |
| 2014/0171135 A1 | 6/2014 | Fan | |
| 2014/0201381 A1 | 7/2014 | Shimizu | |
| 2014/0204746 A1 | 7/2014 | Sun et al. | |
| 2014/0323084 A1 | 10/2014 | Menezes | |
| 2014/0342691 A1 | 11/2014 | Kalavade | |
| 2014/0370847 A1 | 12/2014 | Neal | |
| 2015/0006733 A1 | 1/2015 | Khan et al. | |
| 2015/0278296 A1 | 10/2015 | Alex et al. | |
| 2015/0289123 A1 | 10/2015 | Shatzkamer et al. | |
| 2015/0289167 A1 | 10/2015 | Alex et al. | |
| 2015/0312152 A1 | 10/2015 | Kerr | |
| 2015/0373554 A1 | 12/2015 | Freda | |
| 2016/0044512 A1 | 2/2016 | Potkonjak | |

FOREIGN PATENT DOCUMENTS

| | | |
|---|---|---|
| EP | 2299647 | 3/2011 |
| EP | 2299675 | 3/2011 |
| EP | 2768181 | 8/2014 |
| EP | 2822247 | 1/2015 |
| EP | 2858016 | 4/2015 |
| EP | 2858020 | 4/2015 |
| EP | 2858303 | 4/2015 |
| WO | WO2012/000161 | 1/2012 |
| WO | WO2013/007287 | 1/2013 |

OTHER PUBLICATIONS

Cisco Systems, Inc., "Cisco Policy and Charging Control for Mobile Operators: Efficiently Deploy, Scale, and Manage Services," Solution Overview, May 2011, 5 pages; http://www.cisco.com/en/US/solutions/collateral/ns341/ns973/ns1081/ns1091/solution_overview_c22-609897.pdf.

Gabriel Brown, "Monetization Strategies for Mobile Operators" White Paper, Jul. 2010, 8 pages; http://www.cisco.com/en/US/solutions/collateral/ns341/ns973/Cisco-Mobile-Monetization-WP.pdf.

Wikipedia, the free encyclopedia, "Policy charging and rules function," [retrieved and printed from the Internet Jan. 25, 2013, 2 pages; http://en.wikipedia.org/wiki/Policy_charging_and_rules_function.

EPO Jul. 21, 2014 Extended Search Report and Opinion from European Application Serial No. 14151385.

EPO—Sep. 29, 2014 Extended Search Report and Opinion from European Application Serial No. 14166461.5.

EPO Feb. 12, 2015 Extended Search Report and Opinion from European Application Serial 1485787.

EPO Feb. 23, 2015 Extended Search Report and Opinion from European Application Serial No. 14183238.6.

China Mobile, et al., "Policy Control Based on Network Condition," SA WG2 Temporary Document TD S2-105228, 3GPP TSG SA WG2 Meeting #81, Oct. 11-15, 2010, Prague, Czech Republic, XP-002658059; 4 pages.

NTT DOCOMO, "C-Plane/PCC based Congestion Notification," SA WG2 Temporary Document S2-130872, SA WG2 Meeting #96, Apr. 8-12, 2013, San Diego, US; 5 pages.

ATIS, "Network Optimization Focus Group (NetOp-FG) Assessment and Recommendations," Alliance for Telecommunications Industry Solutions, Sep. 2011; 61 pages.

"GSM 03-08 Version 5.1.0: Digital Cellular Telecommunication System (Phase 2+) Organization of Subscriber Data," ETSI European Telecommunications Standard Institute, Sophia Antipolis, Valbonne France; Apr. 1997; 22 pages.

U.S. Appl. No. 13/841,165, filed Mar. 15, 2013 entitled "Orchestrating Mobile Data Networks in a Network Environment," Inventors: Gibson Soon Teck Ang, et al.

U.S. Appl. No. 13/935,994, filed Jul. 5, 2013 entitled "Integrated Signaling Between Mobile Data Networks and Enterprise Networks," Inventors: Kevin D. Shatzkamer, et al.

U.S. Appl. No. 14/046,684, filed Oct. 4, 2013 entitled "System and Method for Orchestrating Mobile Data Networks in a Machine-to-Machine Environment," Inventors: Kevin D. Shatzkamer, et al.

U.S. Appl. No. 14/044,390, filed Oct. 2, 2013 entitled "System and Method for Orchestrating Policy in a Mobile Environment," Inventors: Arun C. Alex, et al.

U.S. Appl. No. 14/044,433, filed Oct. 2, 2013 entitled "System and Method for Organizing Received Data and Associated Metadata in a Mobile Environment," Inventors: Arun C. Alex, et al.

USPTO Jun. 4, 2015 Non-Final Office Action from U.S. Appl. No. 13/935,994.

USPTO Jun. 4, 2015 Non-Final Office Action from U.S. Appl. No. 14/046,684.

USPTO Jun. 23, 2015 Non-Final Office Action from U.S. Appl. No. 14/044,390.

USPTO Oct. 30, 2015 Notice of Allowance from U.S. Appl. No. 13/935,994.

USPTO Nov. 13, 2015 Non-Final Office Action from U.S. Patent Application Serial No. 14/046,684.

USPTO Oct. 19, 2015 Final Office Action from U.S. Appl. No. 14/044,390.

Fajardo, V., et al., "Diameter Base Protocol," RFC 6733, Internet Engineering Task Force; Oct. 2012; 140 pages.

USPTO Jan. 14, 2016 Non-Final Office Action from U.S. Patent Application Serial No. 03919.0559.

USPTO Apr. 15, 2016 Notice of Allowance from U.S. Appl. No. 14/044,390.

USPTO Feb. 19, 2016 Non-Final Office Action from U.S. Appl. No. 14/044,390.

USPTO Aug. 10, 2016 Final Office Action from U.S. Appl. No. 14/044,390.

USPTO Jul. 12, 2016 Final Rejection from U.S. Appl. No. 13/841,165.

* cited by examiner

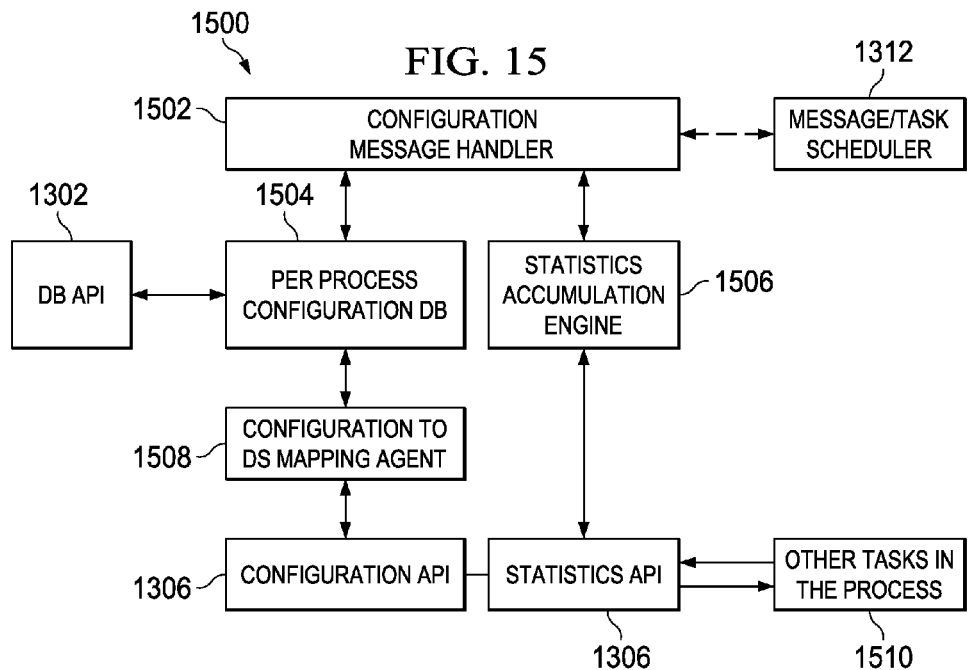
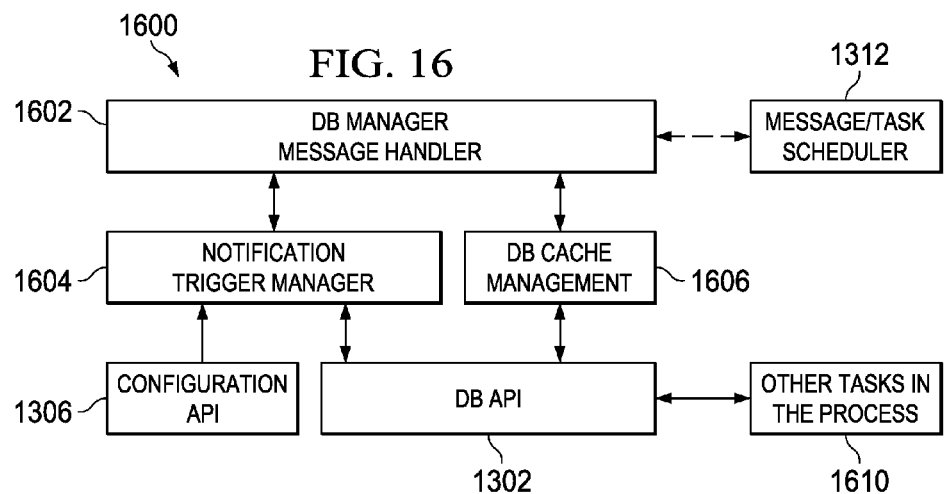

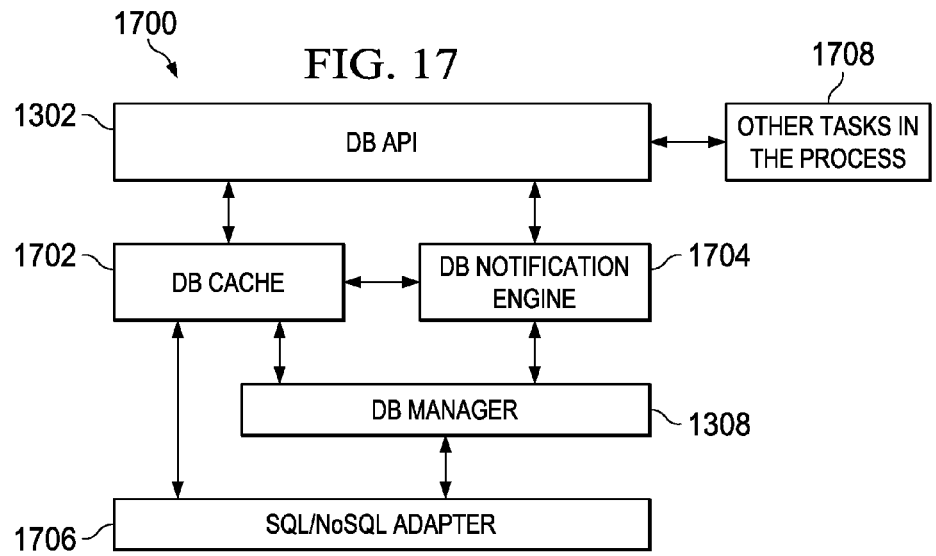
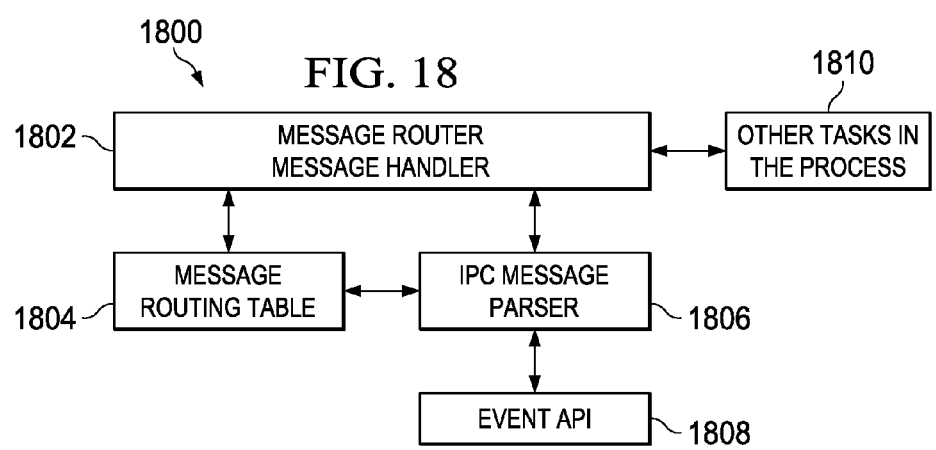

SYSTEM AND METHOD FOR ABSTRACTING AND ORCHESTRATING MOBILE DATA NETWORKS IN A NETWORK ENVIRONMENT

TECHNICAL FIELD

This disclosure relates in general to the field of communications and, more particularly, to providing for abstracting and orchestrating mobile data networks in a network environment.

BACKGROUND

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of free, "over-the-top" and offnet applications and services (such as those from Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information (such as the location of a subscriber, the reachability of a subscriber, etc.) are distributed in various network elements throughout the network. Furthermore, there is no single entity in the network that can: aggregate the information present in the different network elements, correlate the information, and feed that information to various external entities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 15 illustrates a simplified block diagram showing logical components of an embodiment of configuration manager of FIG. 13;

FIG. 16 illustrates a simplified block diagram showing logical components of an embodiment of the data (DB) manager of FIG. 13;

FIG. 17 illustrates a simplified block diagram showing logical components of an embodiment of the DB API of FIG. 13; and FIG. 18 illustrates a simplified block diagram showing logical components of an embodiment of the message routing manager of FIG. 13.

DETAILED DESCRIPTION OF EXAMPLE EMBODIMENTS

Overview

A method is provided in one example and includes receiving data from a network element, determining a candidate data processing task for the received data based upon a first similarity metric between the received data and data currently associated with the candidate data processing task, and sending the received data to the candidate data processing task. In more particular embodiments, the method further includes receiving an indication regarding whether the candidate data processing task has accepted the received data. In still another embodiment, the method further includes updating similarity information for the candidate data processing task based upon whether the candidate data processing task has accepted the received data. In still other particular embodiments, the method further includes determining a next candidate data processing task if the candidate data processing task indicates that the data processing task has not accepted the received data.

In a more particular embodiment, the method further includes determining, by the candidate data processing task, whether the received data is suitable for the candidate data processing task based upon a second similarity metric. In still another particular embodiment, the method further includes sending a message indicative of whether the candidate data processing task has accepted the received data based upon whether the received data is suitable for the data processing task. In still another particular embodiment, the method further includes processing the received data by the candidate data processing task according to at least one predefined rule.

Example Embodiments

Figure 1:
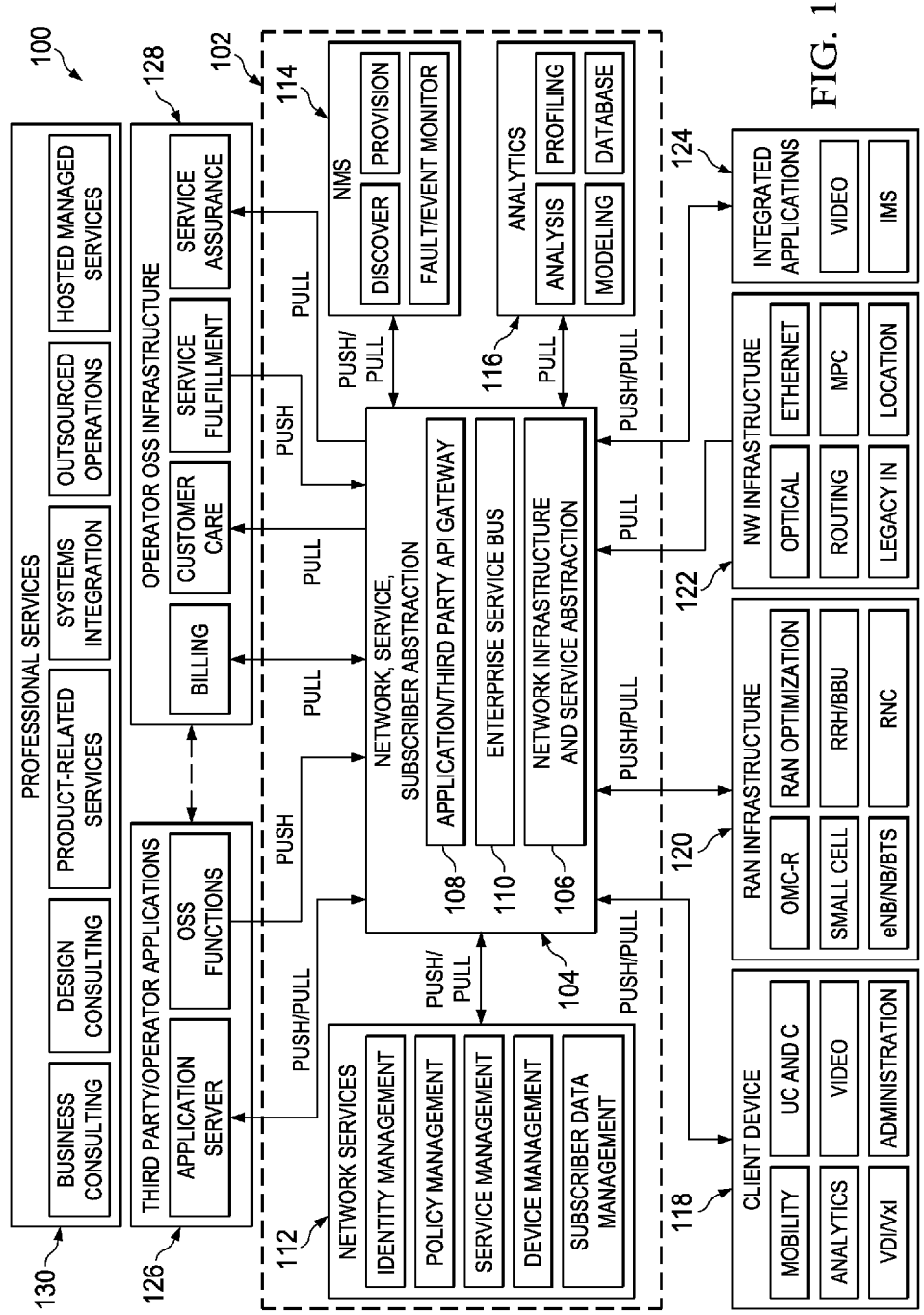
FIG. 1 is a simplified block diagram showing a high level architecture of a communication system for abstracting and orchestrating mobile networks in accordance with one embodiment of the present disclosure.

Referring now to FIG. 1, FIG. 1 is a simplified block diagram showing a high-level architecture of a communication system 100 for abstracting and orchestrating mobile networks in accordance with one embodiment of the present disclosure. Communication system 100 includes a server 102 including a network, service, and subscriber abstraction module 104. The network, service, and subscriber abstraction module 104 includes a network infrastructure and service abstraction layer 106, an application/3rd party application programming interface (API) gateway 108, and enterprise service BUS 110. Server 102 further includes a network services layer 112, a network management system (NMS) 114, and analytics module 116.

Network services layer 112 provides for the management of network services within communication system 100. In a particular embodiment, network services layer 112 may provide one or more of identity management, service management, policy management, device management, and subscriber data management. Identity management enables a service provider to manage subscribers across all applications, device types, and access types. In a mobile context, the Identity management functions may reside within one or more of a home location register (HLR), home subscriber server (HSS), and authentication, authorization, and accounting (AAA) server. Service management enables a service provider to manage services/application charging/rating functions across all access types, device types, and subscribers. In mobile a mobile context, the service management functions may reside in one or more of an online charging subsystem (OCS) and an offline charging subsystem (OFCS). Device management enables a service provider to manage device behavior when interacting with different access and applications. In a mobile context, the device management functions may reside in an Open Mobile Alliance device management (OMA-DM) function and Access network discovery and selection function (ANDSF), but may in other embodiments also extend into operator-specific implementations that allow modification of device parameters, security parameters, application interaction, etc. Policy management enables a service provider to define rules based on various input parameters from identity/service/device management functions, network functions, analytics functions, coupled with internally-defined rules (e.g., time-of-day, promotional), to determine how a specific service for a specific subscriber, on a specific device, at a specific instant (e.g., real-time), when connected to a specific network is to be treated. In a mobile context, the policy management functions may reside live in a policy and charging rules function (PCRF). Subscriber data management enables a service provider to deliver real-time services that reflect individual preferences of subscriber. Subscriber data management may encompass the overarching service layer management workflow items and underlying an service layer management database that allow for multiple structured or unstructured pieces of information to be stored and aggregated into a holistic "user profile". The subscriber data that is managed may include identity information, authentication information, personalization information, policy settings, and settings for specific services.

NMS 114 manages the network elements, also called managed devices, within communication system 100. In a particular embodiment, NMS 114 may include discovery, fault/event monitoring, and provisioning of network elements. Device management may include fault, configuration, accounting, performance, and security management. Management tasks include discovering network inventory, monitoring device health, and status, providing alerts to conditions that impact system performance, and identification of problems, their source(s) and possible solutions. NMS 114 may further collect device statistics and may maintain an archive of previous network statistics including problems and solutions that were successful in the past. If faults recur, NMS 114 may search the archive for the possible solutions. Analytics module 116 analyzes network traffic received by server 104 in real-time and provides for a view of network use within communication system 100. Analytics module 116 may include analysis, profiling, modeling, and database functions.

In accordance with one or more embodiments, network, service, and subscriber abstraction module 104 is configured to collect information or data from various network elements within communication system 100 and abstract the data by examining one or more correlating factors between collected data such as an Internet Protocol (IP) address or mobile subscriber identifier, combine the correlating data together based upon the correlating factors into a consistent store of data which can be later accessed and utilized. Network, service, and subscriber abstraction module 104 is configured in at least one embodiment to collect data from one or more of network services layer 112, NMS 114, and analytics module 116 for abstraction and storage. The abstraction function provides a stateless communications plane for service aggregation and protocol conversion. The abstraction layer includes a mobile IP network enabler that provides a service aggregator function. The aggregation function provides for collection and coordination of real-time network, subscriber, and application intelligence (such as packet core, probes, and other elements) for service enablement. An API gateway provides a protocol translation function, securely enabling deeper integration with third parties. OSS integration provides billing and settlement integration into existing OSS, as well as 3rd party Service Brokers to provide orchestration workflows.

Server 102 is in communication with a client device 118, a radio access network infrastructure 120, network infrastructure 122, and integrated applications 124 through network infrastructure and service abstraction layer 106. In a particular embodiment, client device 118 may include any mobile client device such as a mobile telephone, a smartphone, or a tablet. In a particular embodiment, client device 118 may include mobility, analytics, virtual desktop infrastructure (VDI)/virtual experience infrastructure (VXI), unified communications and collaboration (UC&C), video, and administration functions. RAN infrastructure 120 include hardware and software configured to implement radio access network functions and may include operations maintenance center radio (OMC-R), small cell, eNB/NB/BTS, RAN optimization, RRH/BBU, and radio network controller (RNC) functions. Network infrastructure 122 includes hardware and software configured to implement wired network infrastructure functions and may include optical, routing, legacy IN, Ethernet, MPC, and location functions. Integrated applications 124 are configured to provide integrated application functions such as multimedia functions to fixed or mobile subscribers. In particular embodiments, the multimedia functions may include video, voice over IP (VOIP), and IP Multimedia Subsystem (IMS).

Network, service, and subscriber abstraction module 104 is further configured in at least one embodiment to collect data from one or more of client device 118, RAN infrastructure 120, network infrastructure 122, and integrated applications 124 for abstraction and storage.

Server 102 is further in communication with 3rd party/operator applications 126 via application/3rd party API gateway 108, and operator OSS infrastructure 128 via enterprise service bus 110. 3rd party/operator applications 126 provide third party services and operations support systems (OSS) services to subscribers in the network. In particular embodiments, 3rd party/operator applications 126 may include an application server and OSS functions. In one or more embodiments, 3rd party/operator applications 126 may provide enterprise, over-the-top (OTT), and cloud service delivery platform (SDP) services and/or applications to communication network 100. In particular embodiments, third party applications may include delivery of media and other content from content providers such as mobile applications, music, ringtones, games, video clips, and real-time sports information. Operator OSS infrastructure 128 supports processes such as maintaining network inventory, provisioning services, configuring network components, managing faults, taking orders, processing bills, and collecting payments. In a particular embodiment operator OSS infrastructure 128 may include billing, customer care, service fulfillment, and service assurance components. The billing component may include retail billing which enables operators to generate a customer bill based on service plan, usage, promotions, and other OSS interactions, and enabling third parties to leverage operator billing systems for charging a subscriber such as for an in-app purchase that appears on the customer's bill, allowing third party Wi-Fi providers to bill the subscriber, or service delivery platform interaction (e.g., ringtone download). The billing component may also enable an analytical based approach to understanding subscriber billing trends as a means of providing information to an operator that might facilitate service creation, campaign creation, pricing, etc. This may be for a prepaid user, in which case the billing system also manages quota/balance in real-time, converged (across multiple access types), and postpaid.

The customer care component may include customer interaction systems to provide channels for customer self-service and direct machine-to-customer information, customer relationship management to provide sophisticated marketing, sales and operational support to the service provider agents who interact with the customer, and subscriber management software to support care agents and direct customer interaction. The service fulfillment component may include systems to provide order management systems to orchestrate the steps needed to implement customer orders, handle interdependencies, requests to other content service providers (CSPs) and content providers, and manual work orders. The service fulfillment component may further include inventory management systems to track the inventory available to supply services in the network, assign resources, design network connections, and discover network configurations and reconcile them with inventory records. The service fulfillment component may further provide for activation to automatically configure network equipment and network-serving systems to provide a subscriber-requested service, and engineering tools refers to support engineers who plan, design, install and configure networks and services, including planning and design tools, outside plant and geographical information systems, and network installation and configuration tools.

The service assurance component may include service management systems to link customers with their individual services, and enable CSPs to generate granular reports on each customer and service to validate service-level commitments. The service assurance component may further include performance monitoring systems to collect circuit-switched and packet data from the network elements and element management systems supplied by equipment manufacturers and provide reports for operations staff. The service assurance component may further include workforce automation software used to track incidents resulting from service disruption and effectively dispatch field resources, and probe systems rely on dedicated hardware and software agents to collect signaling and media data from the network. In at least one embodiments, the various components of communication system 100 may interoperate to provide professional services 130 including business consulting, design consulting, product-related services, system integration, outsourced operations and hosted management services.

In various embodiments, network, server, and subscriber abstraction module 104 is configured to provide the abstracted information obtained from data sources within communication system 100, such as client device 118, to an information consumer, such as one or more of with 3rd party/operator applications 126 and operator OSS infrastructure 128, which uses the information to provide some value-added service to subscribers in the network as will be further described herein.

In the particular embodiment illustrated in FIG. 1, network services layer 112, NMS 114, client device 118, RAN infrastructure 120, integrated applications 124, the application server of 3rd party/operator applications 126 have push/pull data connections with network, service, and subscriber abstraction module 104. Further, in the particular embodiment illustrated in FIG. 1, analytics module 116, network infrastructure 122, the OSS functions of 3rd party/operator applications 126, and the component of operator OSS infrastructure 128 have a pull connection with network, service, and subscriber abstraction module 104.

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of free, "over-the-top" and offnet applications and services (such as those from Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile Internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information like the location of a subscriber, the reachability of a subscriber, etc. are distributed in various network elements throughout the network. There is no single entity in the network that can aggregate the information present in the different network elements, correlate the information, and feed that information to various external entities.

The current challenges for creating new services include: Long time to availability—12-18 months to enable services; service silos—building one service doesn't always help build the second service; personalization—each service has unique requirements; No killer application—market conditions vary between operators and regions; lag in response times—can't quickly create or modify services in response to market trends. While operators have significant challenges, they also have significant market advantages and unique value. For example, application developers are clamoring to leverage information only available in the network. Application provider challenges include: Restricted or no access to the network; no real time access; do not want to understand the operator topology; difficult to correlate multiple sources/vendors; and no standard interface to carrier applications/services.

Mobile operators have the opportunity to leverage the key asset in their networks—real-time subscriber, application, and network intelligence—and build an architecture that harvests this intelligence to monetize the network. Various embodiments described herein provide a monetization architecture that increases service velocity, quickly enabling multiple use cases, while providing a platform for application developers to leverage the network. This may provide increased revenue for both the operator and application developers, while enhancing the subscriber experience.

At least one embodiment solves the problem of abstracting out data from different sources and organizing the data into a coherent format that can be translated into one or more external protocols such as HTTP, XMPP, diameter, etc. Existing systems are not capable of correlating data from multiple sources, perform analytics and present the information in a coherent format in a network wide scalable way. In addition, existing systems require more than one entity to perform similar functions, but still lack scalability to provide network scale solutions.

In various embodiments, network, service, and subscriber abstraction module 104 may further function as a data flow engine that incrementally correlates the data from various sources to extract useful network-wide information. This along with high horizontal scalability allows network, service, and subscriber abstraction module 104 to provide network level abstraction. In various embodiments, network, service, and subscriber abstraction module 104 collects network wide data, performs a set of transformations on the data and correlates the data to make it presentable in a coherent format that can be used by entities outside network, service, and subscriber abstraction module 104.

In one or more embodiments, network, service, and subscriber abstraction module 104 is built as a cluster of physical processing nodes in which each node in the cluster holds several logical processing entities. A cluster is made up a logical grouping of one or more nodes. A node is a physical processing element within a cluster with processor resources, memory resources, and storage resources. The logical entities on each node in the system are termed data control tasks (DCT's) and data processor tasks (DPT's). Accordingly, each node has a DCT process and multiple DPT's based upon availability of computational resources. The DCT is a logical entity in each node responsible for routing of the data to appropriate data processing elements that are the DPT's. The DCT, in addition to routing of the data, may also perform any protocol normalization by converting protocol transactions (HTTP, Diameter, XMPP, Netflow, IPFix, etc.) into internal logical operations understood by the DPT's. The DPT's act as repositories of data as well as the processing elements that perform distributed operations on the data. The DPT's support a number of primitive operations that can be combined together via configuration information to performs complex operations. In one or more embodiments, the configuration itself can be performed via a command line interface or a web interface.

In particular embodiments, communication system 100 provides for a flexible mobile architecture/framework that enables operators to quickly create and modify use cases for monetization by harvesting, abstracting, and monetizing intelligence from the network. Monetization uses which may include such services as general consumer control points, targeted ad insertion, video, Femto/Wi-Fi/location/presence information, Telepresence, congestion/control, telematics, remote/video surveillance, automatic metering infrastructure, ATM/POS, remote monitoring/automation, information display, IMS cloud, voice and video over LTE, and messaging.

Figure 2:
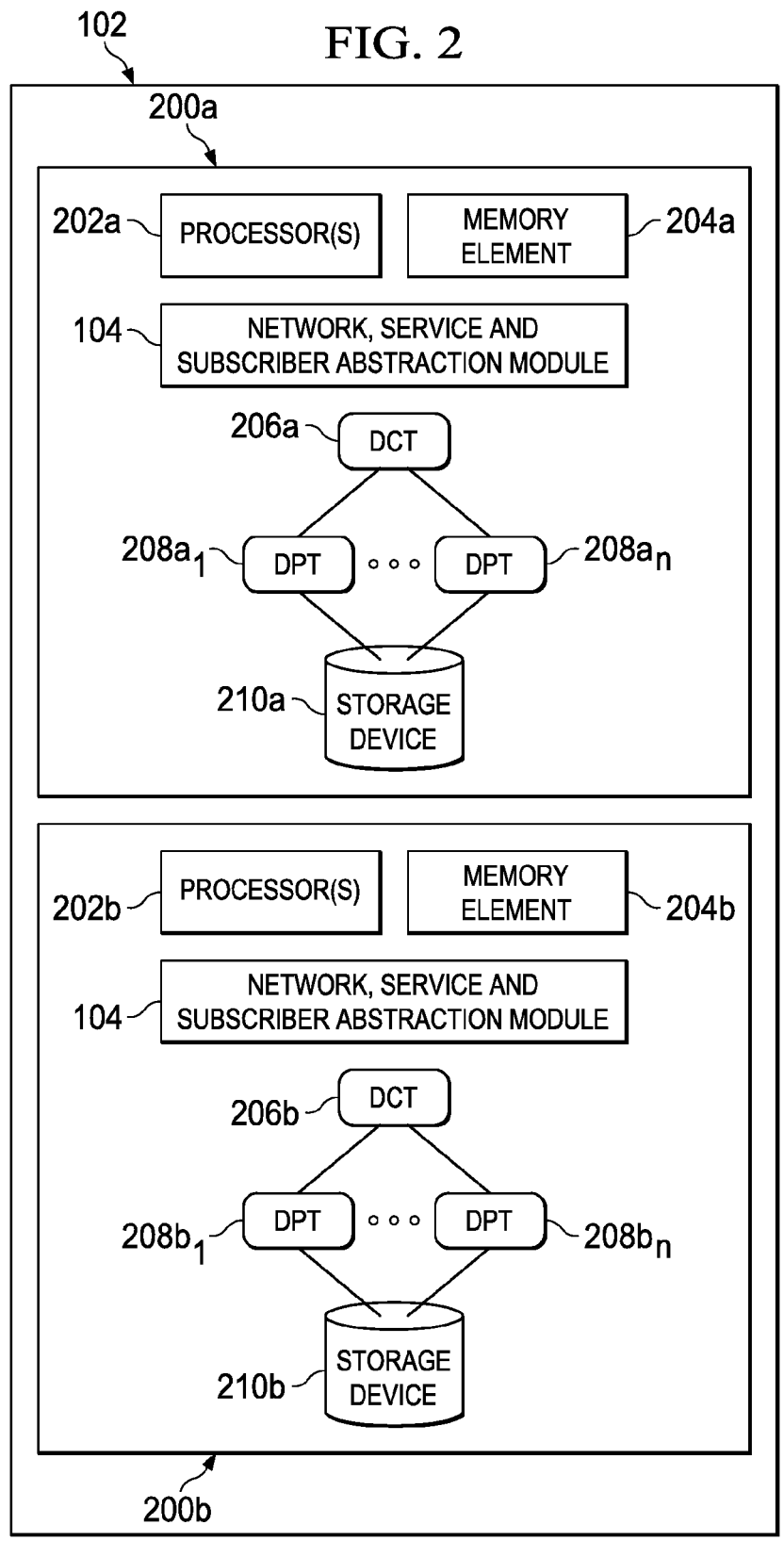
FIG. 2 is a simplified block diagram illustrating a particular embodiment of a server of the communication system of FIG. 1.

FIG. 2 is a simplified block diagram illustrating a particular embodiment of server 102 of communication system 100 of FIG. 1. The particular embodiment of server 102 of FIG. 2 includes a first processing node 200a and a second processing node 200b. In a particular embodiment, first processing node 200a and second processing node 200b may each be embodied upon separate blades of server 102. First processing node 200a and second processing node 200b form a cluster. First processing node 200a includes processor(s) 202a, memory element 204a, network, and service and subscriber module 104. Processor(s) 202a are configured to execute software instructions to perform various operations of first processing node 200a as described herein. Memory element 204a may be configured to store software instructions and data associated with first processing node 200a. First processing node 200a further includes a DCT 206a, a number of DPTs $208a_1$-$208a_n$ associated with DCT 206a, and a storage device 210a. DCT 206a is responsible for routing data received by first processing node 200a to one or more of DPT $208a_1$-$208a_n$ based on a similarity measure such that similar data is preferably routed to the same DPT. One or more of DPT $208a_1$-$208a_n$ processes the data and stores the processed data within storage device 210a.

Similarly, second processing node 200b includes processor(s) 202b, memory element 204b, network, and service and subscriber module 104. Second processing node 200a further includes a DCT 206b, a number of DPTs $208b_1$-$208b_n$ associated with DCT 206b, and a storage device 210b. DCT 206b is responsible for routing data received by second processing node 200n to one or more of DPT $208n_1$-$208n_n$ based on a similarity measure such that similar data is preferably routed to the same DPT. One or more of DPT $208b_1$-$208b_n$ processes the data and stores the processed data within storage device 210a.

Although the particular embodiment illustrated in FIG. 2 shows server 102 as including first processing node 200a and second processing node 200b, it should be understood that in other embodiments server 102 may include any number of processing nodes. In still other embodiments, a cluster may be formed of any number of processing nodes distributed throughout a number of servers or other network elements within the communication network.

In one implementation, first processing node 200a and second processing node 200b include software to achieve (or to foster) the abstraction operations as outlined herein in this Specification. Note that in one example, each of these elements can have an internal structure (e.g., a processor, a memory element, etc.) to facilitate some of the operations described herein. In other embodiments, the abstraction operations may be executed externally to these elements, or included in some other network element to achieve this intended functionality. Alternatively, first processing node 200a and second processing node 200b may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 3:
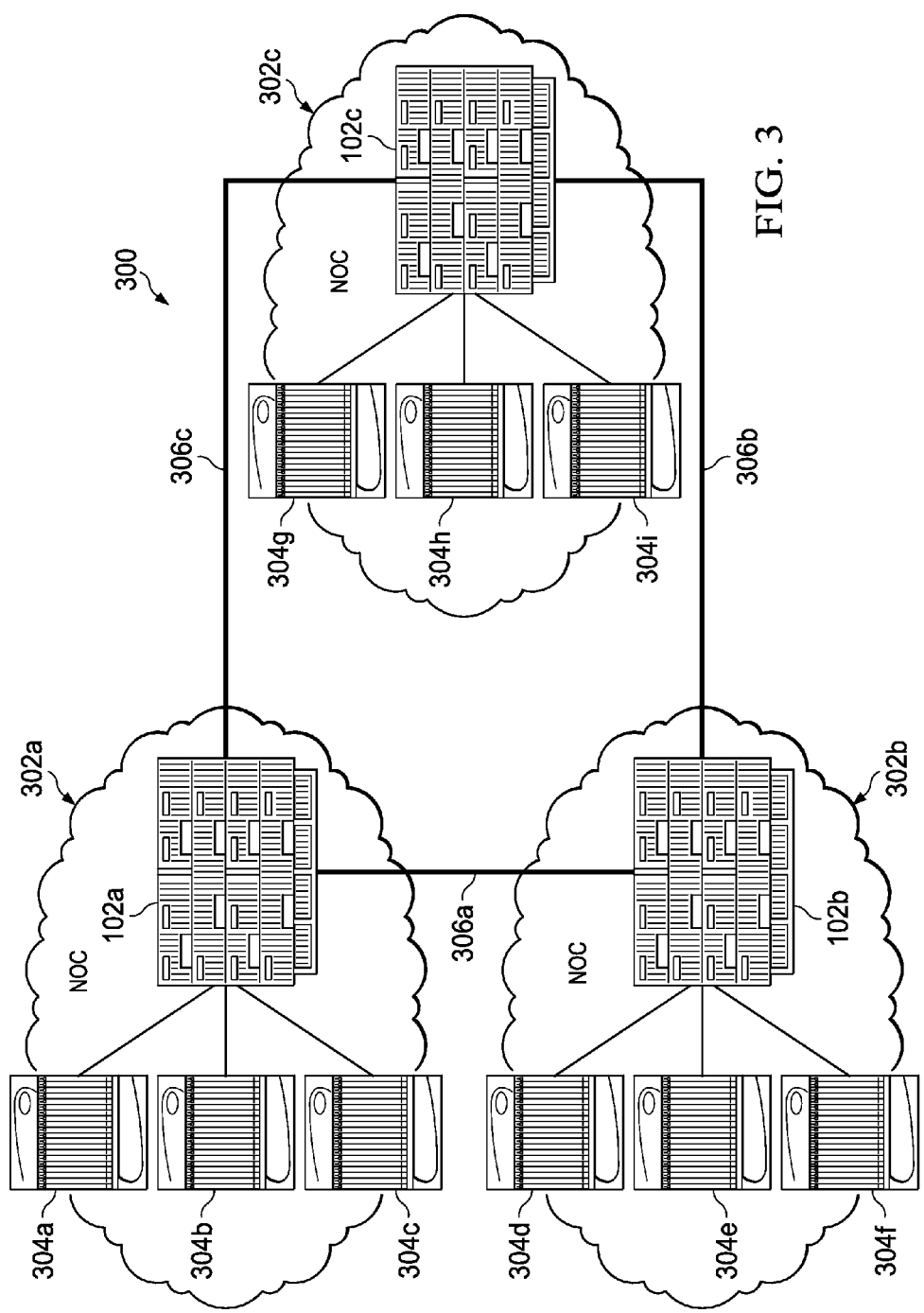
FIG. 3 is a simplified block diagram of an embodiment of a communication system having a number of servers distributed across a number of network operation centers (NOCs)

FIG. 3 is a simplified block diagram of an embodiment of a communication system 300 having a number of servers 102a-102c distributed across a number of network operation centers (NOCs). Each of servers 102a-102c includes one or more nodes having network, service, and subscriber abstraction module 104. Server 102a is located at a first network operation center (NOC) 302a, server 102b is located at a second NOC 302b, and server 102c is located at a third NOC 302c. First NOC 302a furthers includes gateways 304a-304c in communication with server 102a and configured to provide data from a network element such as a client device or other data source to server 102a. Similarly, second NOC 302n furthers includes gateways 304d-304f in communication with server 102b and configured to provide data from a network element such as a client device or other data source to server 102b. In addition, third NOC 302c furthers includes gateways 304g-304i in communication with server 102c and configured to provide data from a network element such as a client device or other data source to server 102c. Communication system 300 further includes a first interconnect 306a between server 102a and server 102b, a second interconnect 306b between server 102b and server 102c, and a third interconnect 306c between server 102a and server 102c. The communication system 300 of FIG. 3 allows for the network, service, and data functionality to be distributed across first NOC 302a, second NOC 302b, and third NOC 302c. In such an embodiment, applications and other entities may query for data from any one of server 102a, server 102b, and server 102c. An advantage that may be provided by communication system 300 is that since most traffic in communication system 300 flows from gateways 304a-304i to their respective servers 102a-102c, the close proximity of gateways 304a-304i to their respective servers 102a-102c allows for reduced latency.

Figure 4:
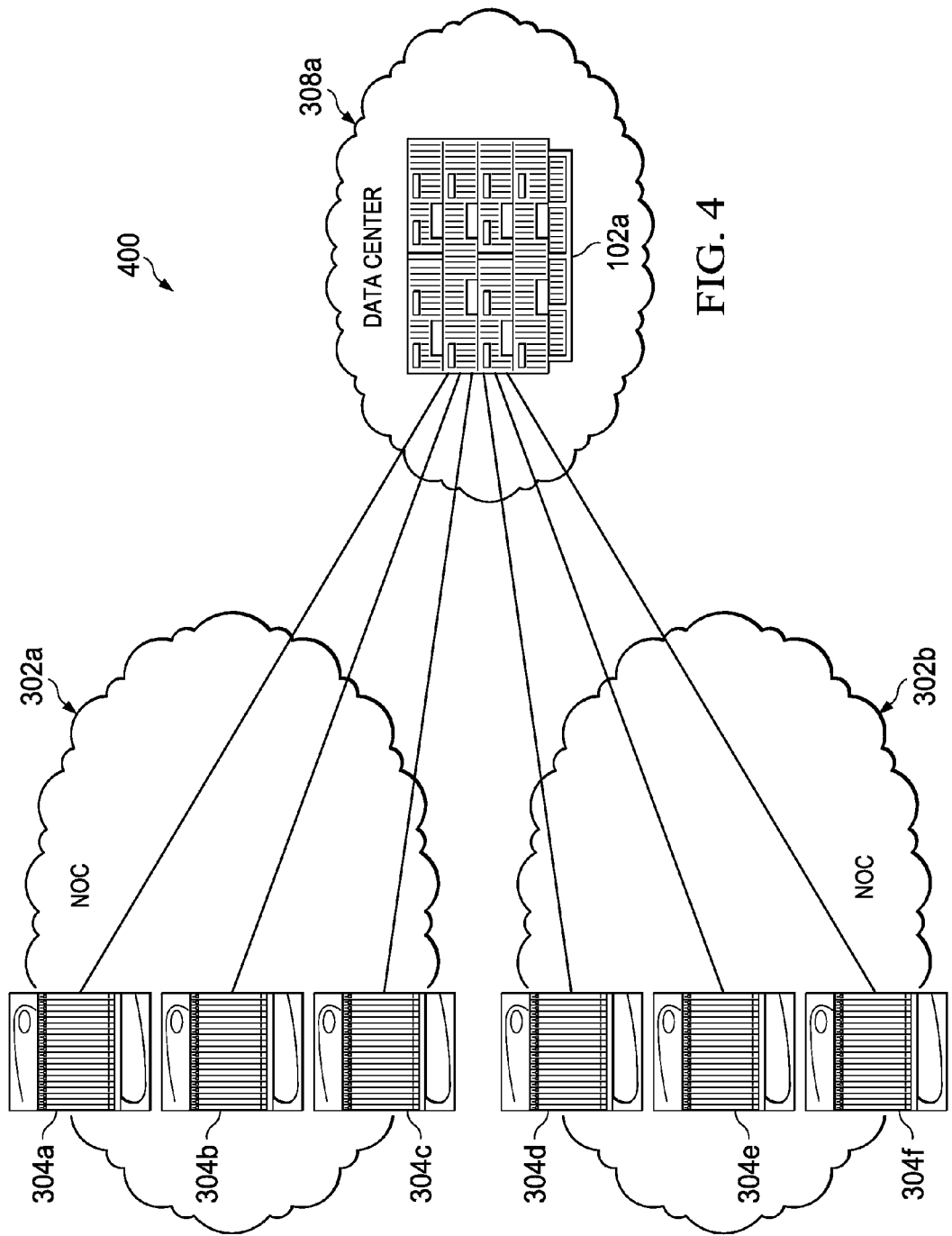
FIG. 4 is a simplified block diagram of an embodiment of a communication system having a server located in a centralized data center.

FIG. 4 is a simplified block diagram of an embodiment of a communication system 400 having a server 104a located in a centralized data center 308a. Communication system 400 includes gateways 304a-304c located at a first NOC 302a, gateways 304d-304f located at a second NOC 302b, and a server 102a located at a centralized data center 308a. Each of gateways 304a-304f is in communication with server 102a and is configured to provide data from a network element such as a client device or other data source to server 102a. In communication system 400 the data from network elements connected to gateways 304a-304f is backhauled from first NOC 302a and second NOC 302b to server 102a at the centralized data center 308a.

Figure 5:
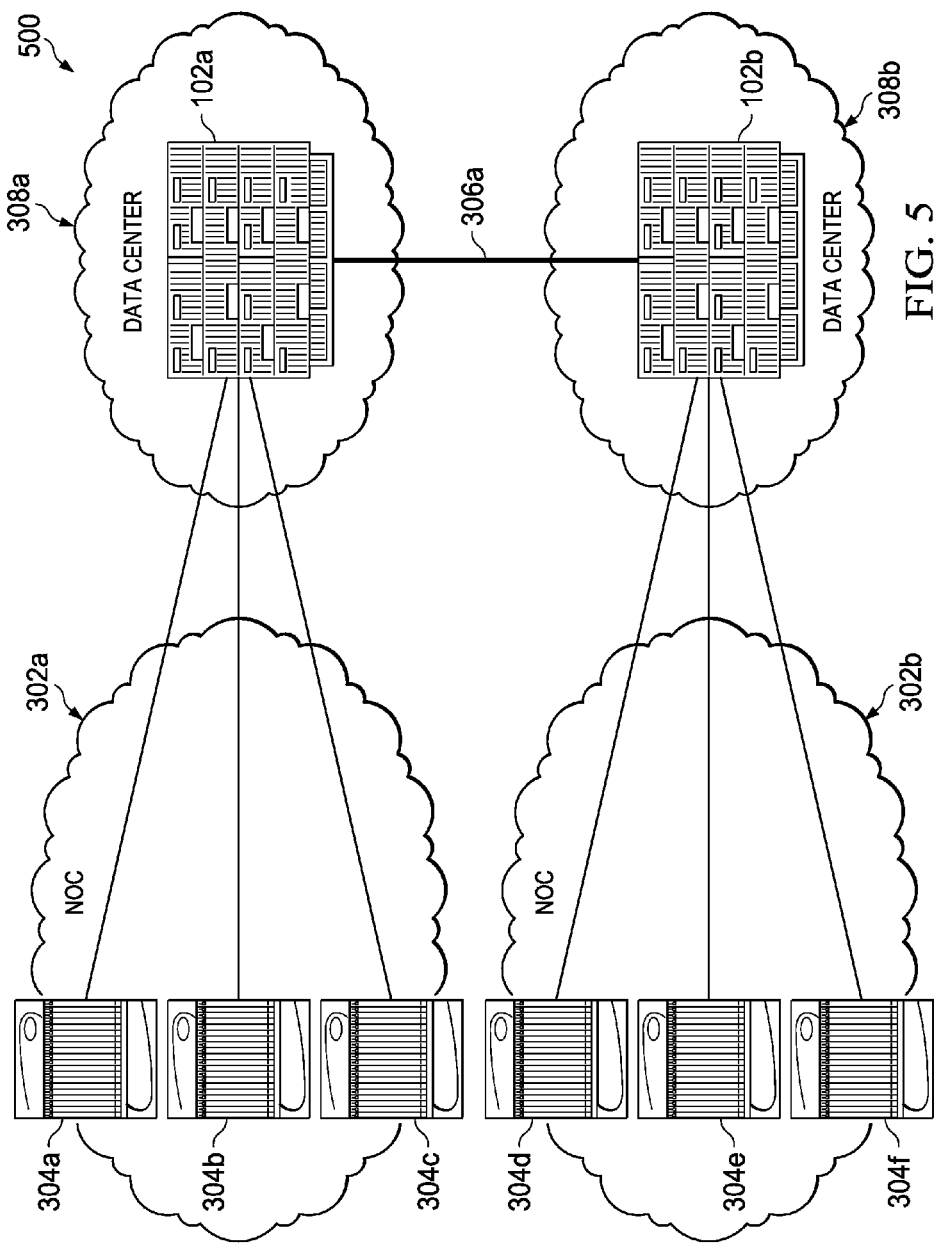
FIG. 5 is a simplified block diagram of an embodiment of a communication system having a servers located in multiple data centers.

FIG. 5 is a simplified block diagram of an embodiment of a communication system 500 having a plurality of servers 104a-104b located in multiple data centers 308a-308b. Communication system 500 includes gateways 304a-304c located at a first NOC 302a, gateways 304d-304f located at a second NOC 302b, a server 102a located at a first data center 308a, and a server 102b located at a second data center 308b. Each of gateways 304a-304c is in communication with server 102a and is configured to provide data from a network element such as a client device or other data source to server 102a. Each of gateways 304d-304f is in communication with server 102b and is configured to provide data from a network element such as a client device or other data source to server 102b. Communication system 500 further includes a first interconnect between server 102a and server 102b. The communication system 500 of FIG. 5 allows for the network, service, and data functionality to be distributed across first data center 308a and second data center 308b. In such an embodiment, applications and other entities may query for data from any one of server 102a and server 102b.

Figure 6:
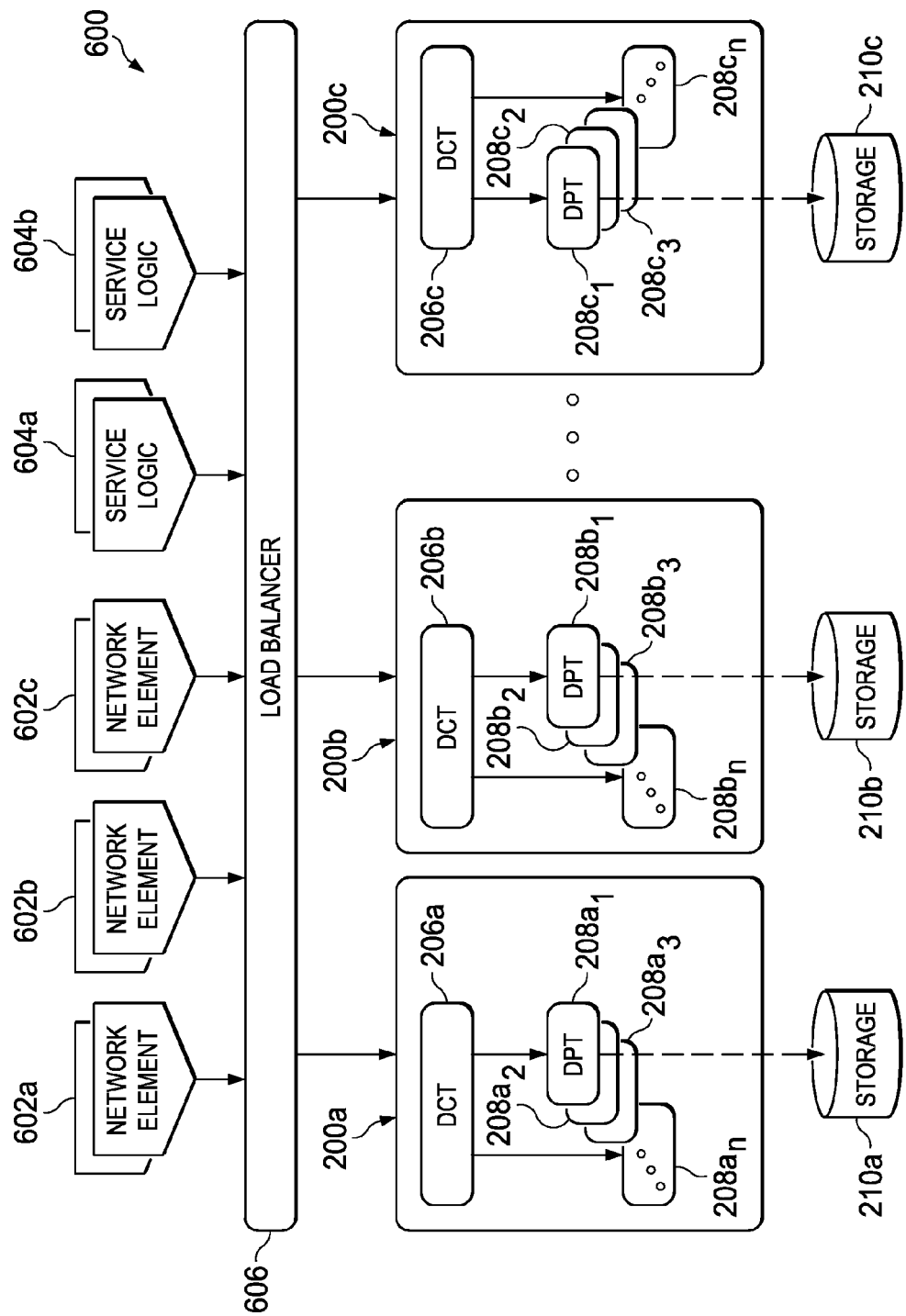
FIG. 6 is a simplified block diagram of a cluster for abstracting data in accordance with one embodiment.

FIG. 6 is a simplified block diagram of a cluster 600 for abstracting data in accordance with one embodiment. Cluster 600 includes first processing node 200a, second processing node 200b, and third processing node 200c. First processing node 200a includes a DCT 206a and a plurality of DPTs $208a_1$-$208a_n$ connected to storage device 210a. Second processing node 200b includes a DCT 206b and a plurality of DPTs $208b_1$-$208b_n$ connected to storage device 210b. Third processing node 200a includes a DCT 206c and a plurality of DPTs $208c_1$-$208c_n$ connected to storage device 210c. Each of first processing node 200a, second processing node 200b, and third processing node 200c is configured to receive one or more data feeds from a network element 602a, a network element 602b, a network element 602c, service logic 604a, and service logic 604b via a load balancer 606. In still other embodiments, load balancer 606 may be omitted.

A particular DCT 206a-206c is responsible for distributing data between different nodes or DPTs $208a_1$-$208a_n$, $208b_1$-$208b_n$, $208c_1$-$208c_n$ that are the fundamental entities that perform the processing of data. In particular embodiments, routing of data by a DCT 206a-206c is based upon the nature of the data. Data that is determined to be related is preferably routed to the same DPT. If the data is not determined to be related, the DCT 206a-206c attempts to distribute it to different nodes for processing. In one or more embodiments, data is determined to be related based upon one or more similarity metrics. For example, a subscriber may have a particular location associated with the subscriber, an IP address associated with the subscriber, or a certain number of bearers created on some network element for the subscriber. Data having these same characteristics may be determined to be related. In some embodiments, a hierarchical relationship may exist between data and this hierarchical information may be utilized to determine similarity metrics between data in order to route the data.

DPTs $208a_1$-$208a_n$, $208b_1$-$208b_n$, $208c_1$-$208c_n$ may function to store the data itself as well as perform incremental processing of the data. In a particular embodiment, DPTs $208a_1$-$208a_n$, $208b_1$-$208b_n$, $208c_1$-$208c_n$ may perform incremental computations on the data and store some partially computed data so that when some entity queries for the data, the partially correlated data may be retrieved and the correlations may be completed to generate the queried-for data. In various embodiments, rules may be conferred upon a particular DPT such that if particular data received by the DPT is changing, a running tabulation is kept running so that if the information is requested by a query minimal processing will be performed at the time of query. For example, if a particular rule indicates that a number of visits to a particular web site should be tracked, this information can be automatically collected and the number of visits can be incrementally computed so that when this information is queried it may be provided quickly. In some embodiments, most of the information may be stored in memory for speed of access, however some data may be stored in a particular storage device $210a$-$2010c$ such as an internal hard drive, storage area network (SAN), or persistent storage.

As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

Figure 7:
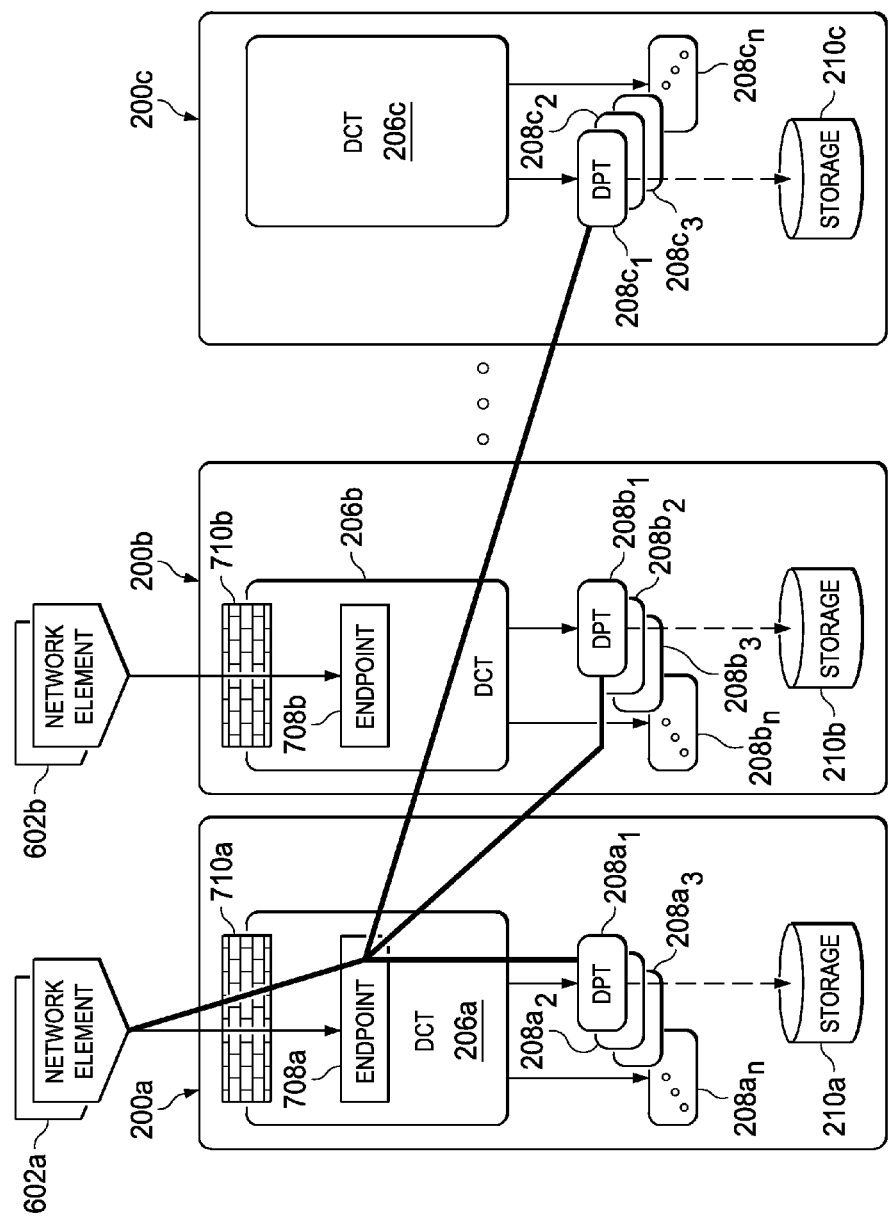
FIG. 7 is a simplified block diagram illustrating an embodiment of data routing operations in the cluster of FIG. 6.

FIG. 7 is a simplified block diagram illustrating an embodiment of data routing operations in the cluster 600 of FIG. 6. In accordance with various embodiments, one or more DCTs may be designated for collecting data from a particular source and logically grouped together as an endpoint. The endpoint is a logical pipe through which the data can be accessed. The endpoint can span any number of DCTs based upon performance requirements. In the particular embodiment of FIG. 7, DCT 206a of first processing node 200a is designated as an endpoint 708a to collect data from network element 602a, and DCT 206b of second processing node 200b is designated as an endpoint 708b to collect data from network element 602b. In the example illustrated in FIG. 7, data from network element 602a is received at endpoint 708a. DCT 206a determines that the particular data should be routed to one or more of DPTs $208a_1$-$208a_n$ of first processing node 200a, DPTs $208b_1$-$208b_n$ of second processing node 200b, and DPTs $208c_1$-$208c_n$ of third processing node 200c based upon one or more similarity metrics and routes the particular data accordingly. Further, DPT processing of particular data may be replicated to other DPTs $208a_1$-$208a_n$, $208b_1$-$208b_n$, $208c_1$-$208c_n$ as well as to one or more of storage devices $210a$-$210c$. In one or more embodiments, a particular DPT $208a_1$-$208a_n$, $208b_1$-$208b_n$, $208c_1$-$208c_n$ may either accept or reject the particular data for processing based upon one or more similarity measures and notify the routing DCT 206a accordingly. If the particular data is rejected by a particular DPT $208a_1$-$208a_n$, $208b_1$-$208b_n$, $208c_1$-$208c_n$, DCT 206a may choose another candidate DPT $208a_1$-$208a_n$, $208b_1$-$208b_n$, $208c_1$-$208c_n$ for processing of the particular data and route the particular data to the candidate DPT. This process may be repeated until a suitable DPT is chosen by DCT 206a.

In one or more embodiments, DCT 206a and DCT 206b may further include a security manager component 710a and security manager component 710b, respectively, to handle access control and secure communication between network elements 602a-602b and endpoints 708a-708b. Security manager component 710a functions to protect data and infrastructure such as endpoint 708a and DPTs $208a_1$-$208a_n$, and security manager component 710b functions to protect data and infrastructure such as endpoint 708b and DPTs $208b_1$-$208b_n$. Some of the security features that may be provided by security manager component 710a, for example, to protect from external access include providing identity management and integration as well as security policies for access control, checking requests from network element 602a or a function call from external API users, ensuring that access to endpoint 708a and DPTs $208a_1$-$208a_n$ are permitted and that attacked are blocked. In particular embodiments a single sign-on (SSO) token may be used to share the security status without a congested federation server regardless of whether the token was issued locally or from another system. Some of the security features that may be provided by security manager component 710a to protect infrastructure include trusting all systems in the datacenter(s) using a cloud key so that a malicious server from inside will not be able to intercept traffic, and using normal cryptography for data security and secure sockets layer (SSL) for connection security, etc. In particular embodiments, the cloud key may be automatically maintained synchronously and integrated with SSO.

Figure 8:
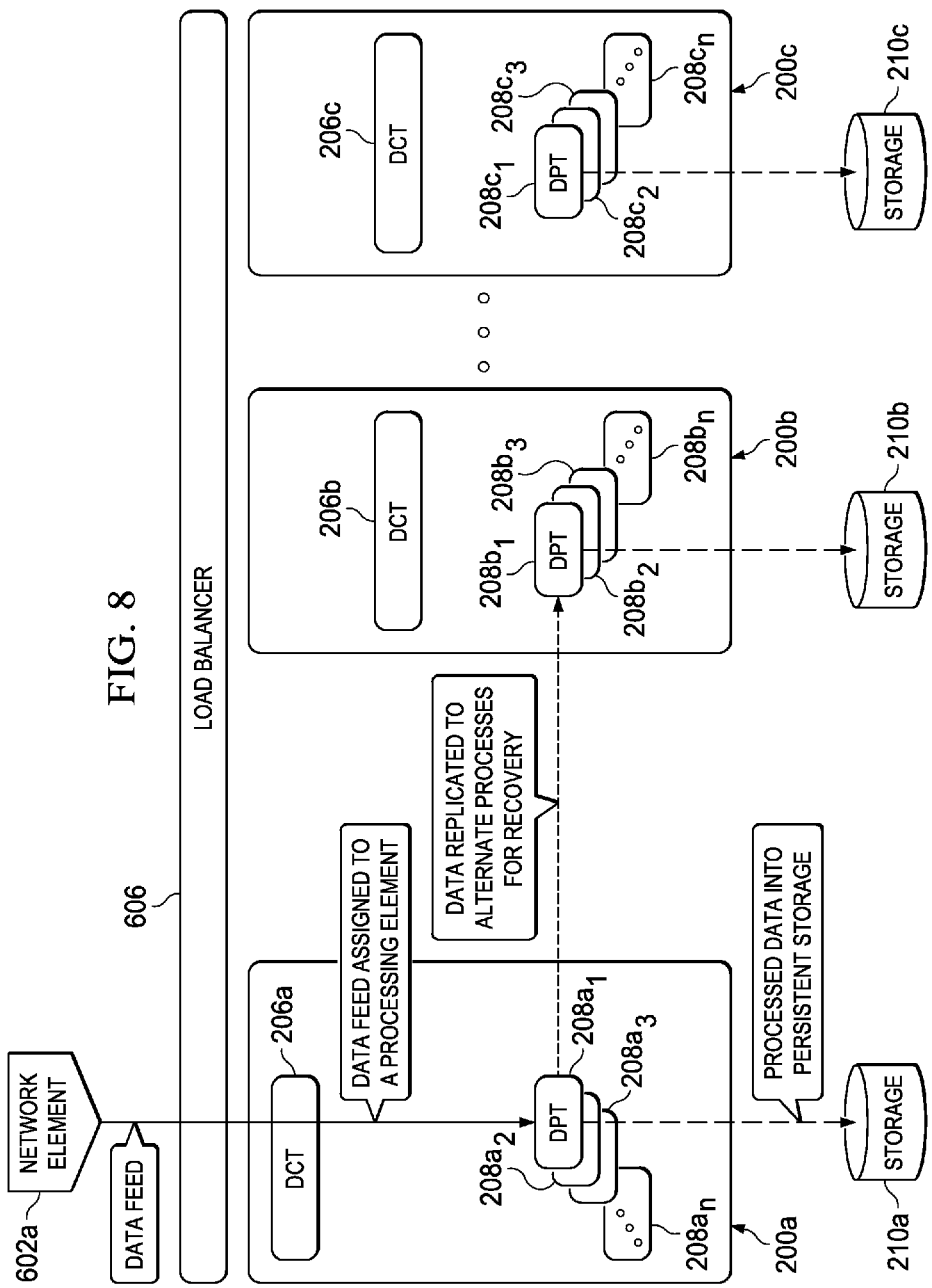
FIG. 8 is a simplified block diagram illustrating an embodiment of processing data feeds in the cluster of FIG. 6.

FIG. 8 is a simplified block diagram illustrating an embodiment of processing data feeds in the cluster 600 of FIG. 6. In the example of FIG. 8, a data feed is received by DCT 206a of first processing node 200a from network element 602a via load balancer 606. DCT 206a then assigns the data feed to one or more of the DPTs $208a_1$-$208a_n$ which processes the data according to one or more rules. The one or more DPTs $208a_1$-$208a_n$ may further store the processed data into persistent storage by copying the data to storage device 210a. In still other embodiments, the data may alternately be replicated from the one or more DPTs $208a_1$-$208a_n$ of first processing node 200a to one or more DPTs $208b_1$-$208b_n$ of second processing node 200b. This replicated data may be used for recovery in case one or more DPTs $208a_1$-$208a_n$ fail.

Figure 9:
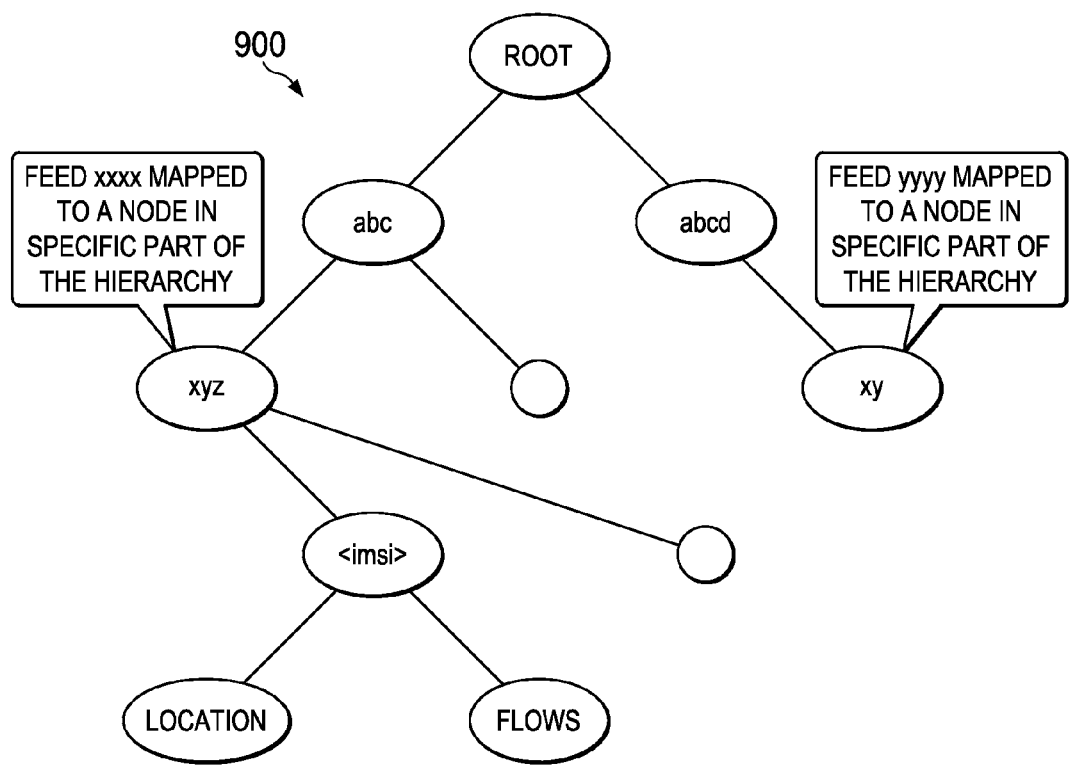
FIG. 9 illustrates a simplified diagram of an embodiment of a hierarchical data structure for storing data feeds associated with the cluster of FIG. 6.

FIG. 9 illustrates a simplified diagram of an embodiment of a hierarchical data structure 900 for storing data feeds associated with cluster 600 of FIG. 6. In the example of FIG. 9, data from a feed xxxx and a feed yyyy received from network elements 602a and 602b, respectively, is mapped to a plurality of nodes in a distributed tree-like hierarchy that is suitable for being queried by external entities. In various embodiments, the hierarchy may be provisioned across each of the nodes with each of the nodes handling certain sections of the tree. As illustrated in FIG. 9, feed xxxx is mapped to a node in a specific part of the hierarchy as /root/abc/xyz, and feed yyyy is mapped to a node in a specific part of the hierarchy as /root/abcd/xy. If a feed containing "imsi" is received with the location and flow information on feed xxxx, the data will be mapped as illustrated in FIG. 9. External elements may query the data contained in the data structure 900 by performing the query using a given interface. The external query may then be load balanced to one of the nodes in the cluster, which may in turn perform the query in a distributed manner to fetch the required data. For example, a user may query for the information in /root/abc/xyz/<imsi> that would be mapped to one of the nodes in the system for processing.

Figure 10:
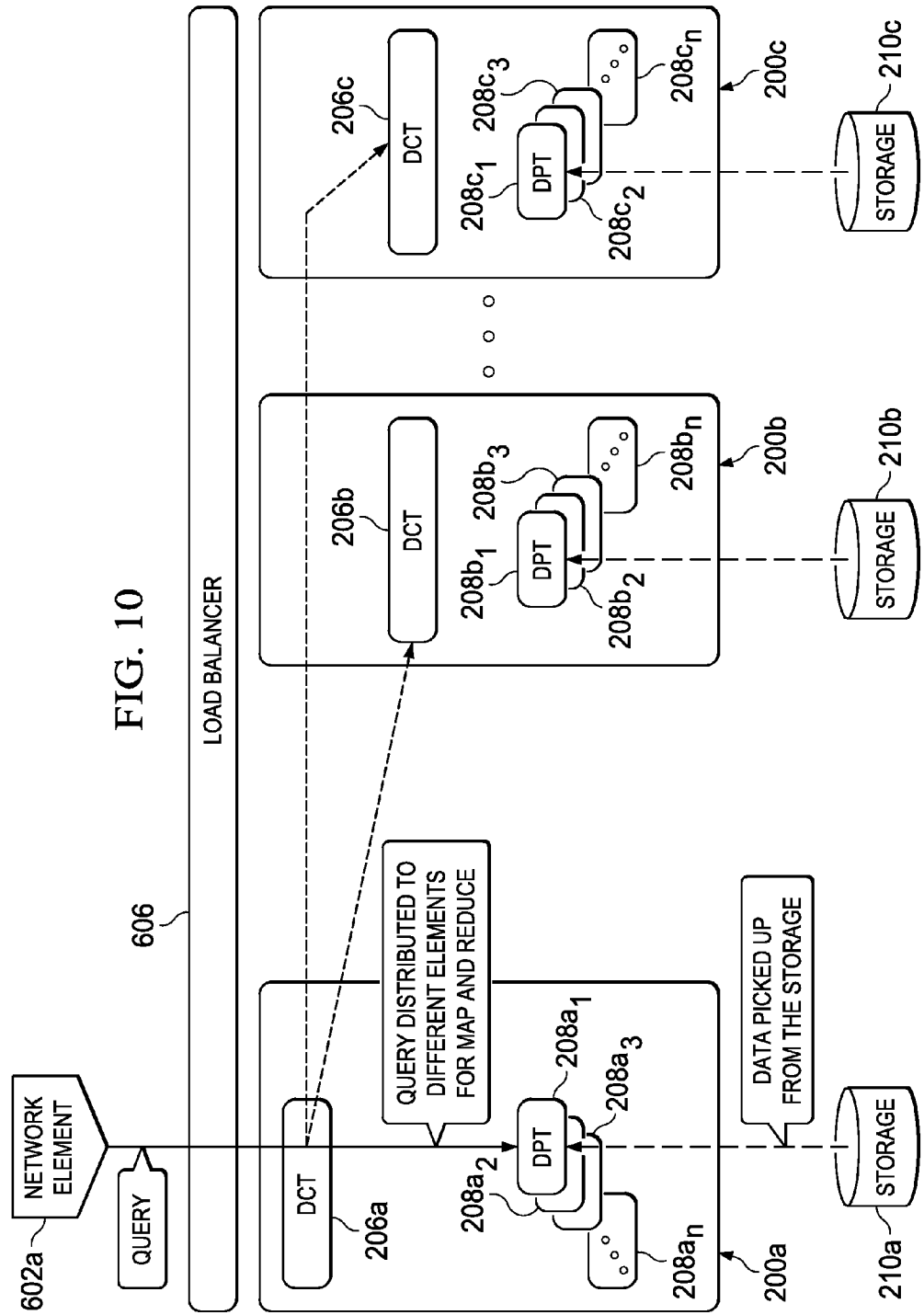
FIG. 10 illustrates a simplified block diagram illustrating an embodiment of processing queries in the cluster of FIG. 6.

FIG. 10 illustrates a simplified block diagram illustrating an embodiment of processing queries in the cluster 600 of FIG. 6. In the example of FIG. 10, a query is received from network element 602a by DCT 206a via load balancer 606 by first processing node 200a. DCT 206a receives the query and distributes the query to different DPTs $208a_1$-$208a_n$ for MAP and reduce operations. The queried data may be picked up from storage device 210a and provided to the querying entity.

Figure 11:
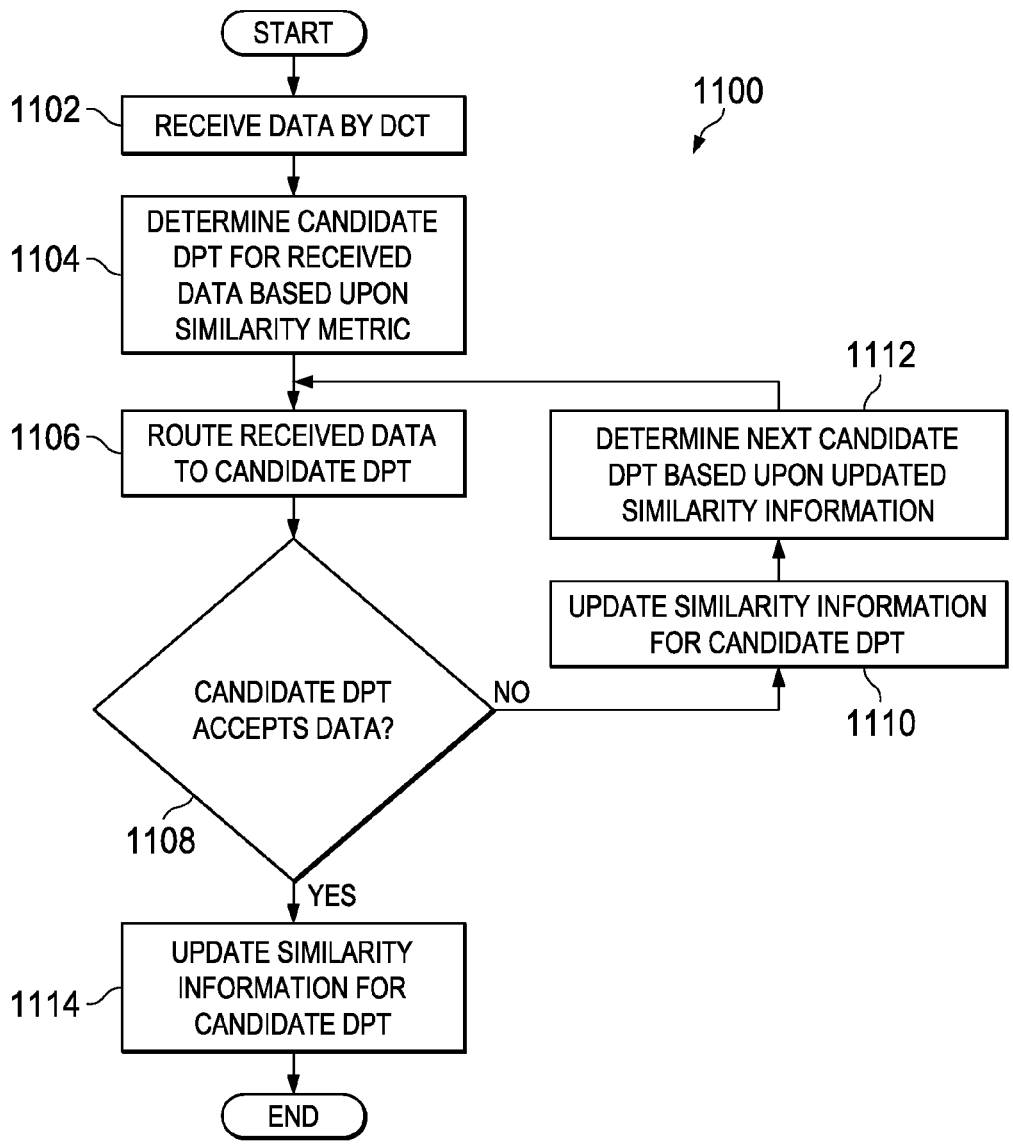
FIG. 11 is a simplified flowchart illustrating one potential procedure for data control task (DCT) processing associated with the present disclosure.

FIG. 11 is a simplified flowchart 1100 illustrating one potential procedure for data control task (DCT) processing associated with the present disclosure. In 1102, data control task (DCT) 206a of first processing node 200a receives data from network element 602a via endpoint 708a. In 1104, DCT 206*a* determines a candidate data processing task (DPT) for the data based upon a similarity metric between the received data and data currently associated with a particular DPT. In a particular embodiment, DCT 206*a* includes an endpoint manager that maintains a distributed hash table which enumerates all of the DPTs in the system and determines that the received data is similar to data already associated with one of the DPTs using a similarity metric, and designates a particular DPT as a candidate DPT if the similarity metric is within a predetermined threshold. In 1106, DCT 206*a* routes the data to the candidate DPT. In various embodiments, the similarity metric determined by DCT 206*a* may a rough approximation of similarity of the received data, and data associated with a candidate DPT.

In 1108, DCT 206*a* determines whether the candidate DPT has accepted the data. In a particular embodiment, the candidate DPT determines whether the data received from DCT 206*a* is similar to data it is currently handling using a similarity metric. In particular embodiments, the similarity metric evaluated by the candidate DPT is representative of a deeper analysis of similarity than that performed by DCT 206*a*. After determining whether the candidate DPT has accepted the data, the candidate DPT may send a response to DCT 206*a* indicative of whether the candidate DPT has accepted the data. If DCT 206*a* determines in 1108 that the candidate DPT does not accept the data, the procedure continues to 1110. In 1110, DCT 206*a* updates similarity information for the candidate DPT indicating that the candidate DPT is not suitable for the type of data associated with the received data. In 1112, DCT 206*a* determines a next candidate DPT based upon the updated similarity information and returns to 1106 in which the data is routed to the next candidate DPT for acceptance or rejection by the next candidate DPT in 1108.

If DCT 206*a* determines in 1108 that the candidate DPT has accepted the data, in 1114 DCT 206*a* updates similarity information for the candidate DPT indicative that the type of the data is a match for the candidate DPT. The procedure then ends. For subsequent transactions, DCT 206*a* has a greater idea regarding how to route subsequent data as the probability of choosing a wrong candidate DPT becomes lower every time data passes through DCT 206*a*. Because DCT 206*a* has better confidence for the particular kind of data, the probability of choosing a wrong candidate DPT tends to decrease. In addition, if a DPT crashes or otherwise becomes inoperative, DCT 206*a* may repeat the procedure 1100 to restore its routing capability that eliminates the need to send broadcast messages to relearn this information.

Figure 12:
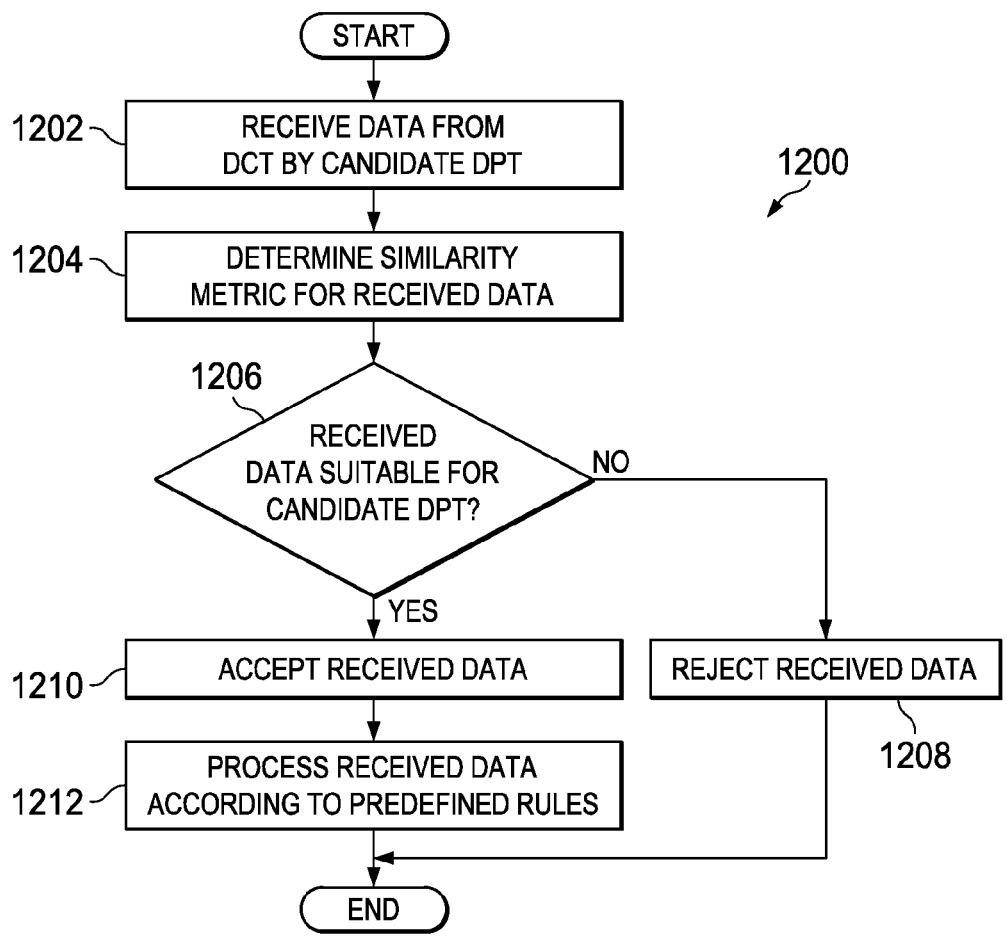
FIG. 12 is a simplified flowchart illustrating one potential procedure for data processing task (DPT) processing associated with the present disclosure.

FIG. 12 is a simplified flowchart 1200 illustrating one potential procedure for data processing task (DPT) processing associated with the present disclosure. In 1202, a candidate DPT receives data from DCT 206*a*. In 1204, the candidate DPT determines a similarity metric for the received data that is indicative of whether the received data is suitable for the candidate DPT. In particular embodiments, the similarity metric evaluated by the candidate DPT is representative of a deeper analysis of similarity than that performed by DCT 206*a*. In 1206, the candidate DPT determines whether the received data is suitable for the candidate DPT based upon the similarity metric. If the received data is not suitable for the candidate DPT, the candidate DPT rejects the received data in 1208 and the procedure ends. In at least one embodiment, the candidate DPT sends a message to DCT 206*a* indicative of the candidate DPT rejecting the received data.

If the candidate DPT determines in 1206 that the received data is suitable for the candidate DPT, the candidate DPT accepts the received data in 1210. In a particular embodiment, the candidate DPT sends a message to DCT 206*a* indicative of the candidate DPT accepting the received data. The procedure then continues to 1212 in which the candidate DPT processes the received data according to one or more predefined rules. For example, a particular rule may indicate that a particular entity should be notified if a particular set of data changes. In another example, one or more rules may indicate that a history or analytics should be kept for particular data. The procedure then ends.

Figure 13:
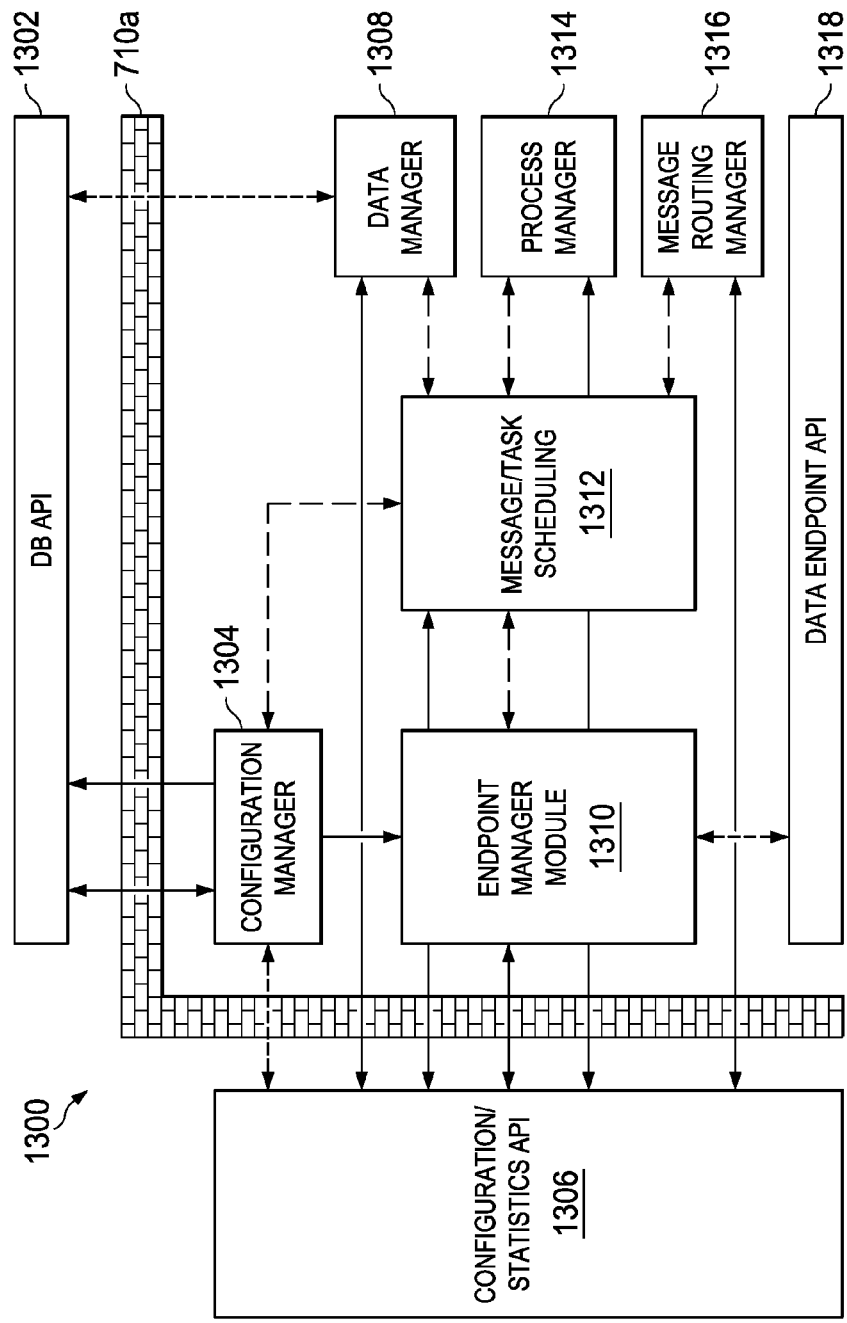
FIG. 13 illustrates a simplified block diagram showing logical components of an embodiment of a DCT process of a processing node.

FIG. 13 illustrates a simplified block diagram 1300 showing logical components of an embodiment of a DCT process of a processing node. The DCT process includes a database (DB) API 1302, configuration manager 1304, config/stats API 1306, data manager 1308, endpoint manager module 1310, message/task scheduling 1312, process manager 1314, message routing manager 1316, and data end point API 1318. DB API 1302 is an API layer visible to all the tasks within a process that maintains the cache and generates notifications. DB API 1302 has function API interfaces with configuration manager 1304 and a function API interface for control with data manager 1308. Configuration manager 1304 manages and synchronizes configuration across the cluster and further has a function API interface for control with config/stats API 1306, a function API interface with endpoint manager module 1310, and a message interface with message/task scheduling 1312. Config/stats API 1306 provides configuration information from the system to endpoint manager module 1310. Data manager 1308 manages the connectivity towards the underlying database (DB) and manages in-memory data caches and notifications. Endpoint manager module 1310 manages service endpoints including protocol translations, load balancing, authorization, and authentication. Endpoint manger module further has functional API interfaces with config/stats API 1306 and message/task scheduling 1312, and a message interface with message/task scheduling 1312. Message/task scheduling 1312 is an engine that is responsible for routing interprocess messages throughout the system such as to local processors or other processors. In a particular embodiment, message/task scheduling 1312 primary uses transport control protocol (TCP) to send messages. Message/task scheduling 1312 further has functional API interfaces and message interfaces with data manager 1308, process manager 1314, and message routing manager 1316.

Process manager 1314 manages the functional blocks within the DCT process and may provide for process level abstraction within the DCT process. Message routing manager 1316 manages routing of messages towards other nodes in the cluster and performs selection of the resource based on load, weight, etc. In particular embodiments, message routing manager 1316 determines the most optimal way of delivering messages within the system. Message routing manager includes a functional API interface with config/stats API 1306 and a message interface with message/task scheduling 1312. Data end point API 1318 provides an interface between endpoint manger module 1301 and the endpoints within the DCT process.

In some embodiments, the DCT process may further include security manager component 710*a* as previously discussed with respect to FIG. 7. In particular embodiments, security manager component 710*a* may be located between DB API 1302 and configuration manager 1304 and data manager 1308, and between config/stats API 1306 and configuration manager 1304, data manager 1308, endpoint manager module 1310, and message routing manager 1316.

Figure 14:
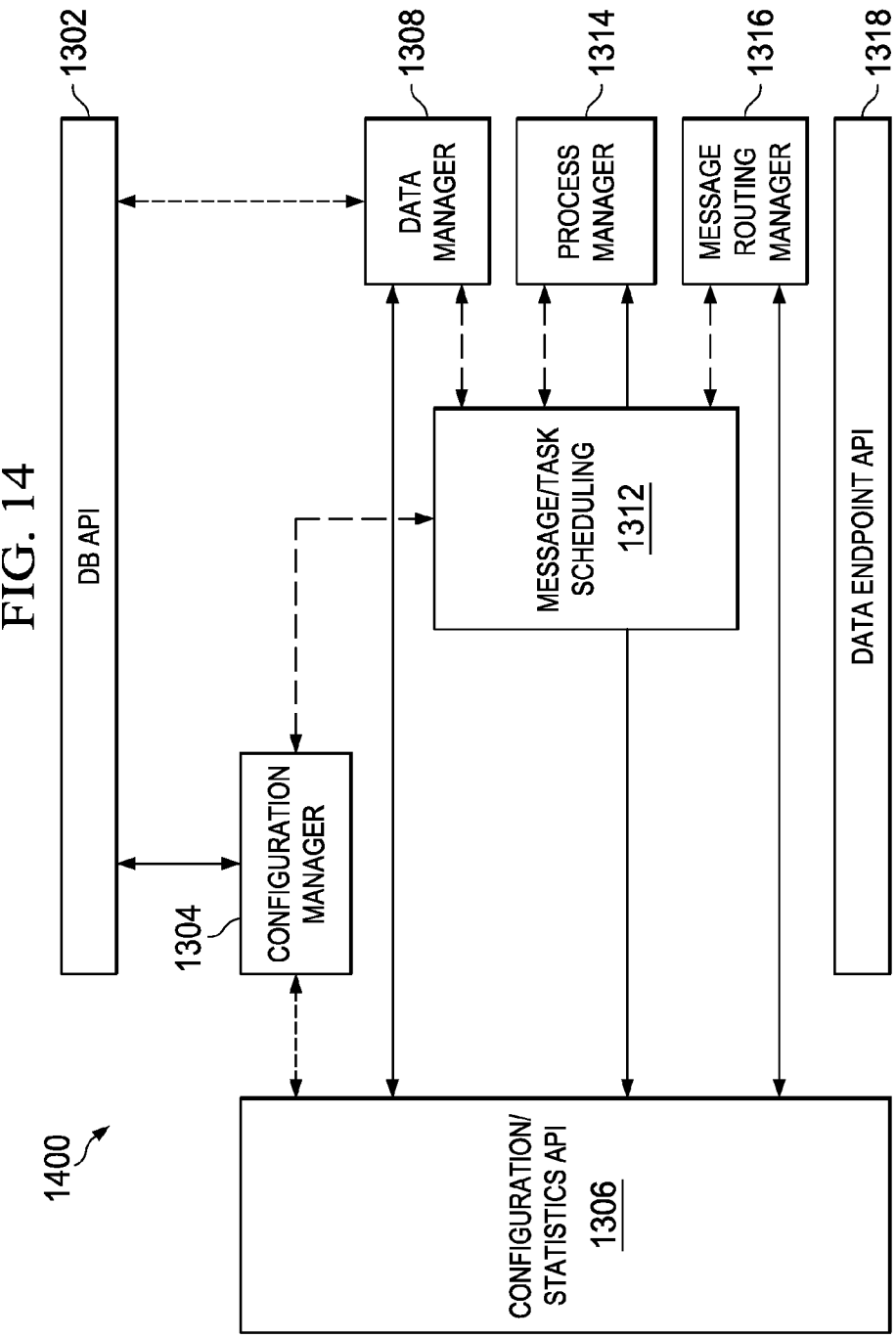
FIG. 14 illustrates a simplified block diagram showing logical components of an embodiment of a DPT process of a processing node.

FIG. 14 illustrates a simplified block diagram 1400 showing logical components of an embodiment of a DPT process of a processing node. The DPT process includes DB API 1302, configuration manager 1304, config/stats API 1306, data manager 1308, message/task scheduling 1312, process manager 1314, message routing manager 1316, and data end point API 1318. These logical components generally operate in a similar manner as described with respect to FIG. 13 with the primary difference being the operation of data manager 1308. In the DPT process illustrated in FIG. 14, data manager 1308 is the entity that performs processing of the data placed in a DPT, manages and maintains data received by the system, performs incremental computations upon the received data, and issues notification messages to entities subscribed to a particular data feed.

FIG. 15 illustrates a simplified block diagram 1500 showing logical components of an embodiment of configuration manager 1304 of FIG. 13. Configuration manager 1304 includes DB API 1302, configuration/stats API 1306, message/task scheduling 1312, configuration message handler 1502, per process configuration DB 1504, statistics accumulation engine 1506, configuration to directory service (DS) mapping agent 1508, and other tasks in the process 1510. Configuration message handler 1502 receives configuration message from message/task scheduling 1312 via a message interface and provides configuration information to per process configuration DB and statistics accumulation engine 1506 via function API interfaces. Per process configuration DB is configured to configure process on a per process basis. Statistics accumulation engine 1506 has a function API interface to config/stats API and is configured to collect statistics from each of the processes and nodes and give and overall statistical view of the processes and nodes of the system. Configuration to DS mapping agent 1508 is configured to configure a directory service in response to configuration information. Configuration manager 1304 may further include other tasks in the process 1510.

FIG. 16 illustrates a simplified block diagram 1600 showing logical components of an embodiment of data (DB) manager 1308 of FIG. 13. DB manager 1308 includes DB API 1302, configuration API 1306, message/task scheduling 1312, DB manager message handler 1602, notification trigger manager 1604, DB cache management 1606, and other tasks in the process 1610. DB manager message handler 1602 handles data messages received from message/task scheduling 1312 via a message interface and has function API interfaces to notification trigger manager 1604 and DB cache management 1606. Notification trigger manager 1604 has functional API interfaces with configuration API 1306 and DB API 1302 and allows an entity to subscribe to triggers in order to be notified when a particular type of data changes. DB cache manage 1606 further has a functional API interface with DB API and functions to manage the DB cache. DB API 1302 further has a functional API interface with other tasks in the process 1610 and provides an application programming interface into DB manager 1308.

FIG. 17 illustrates a simplified block diagram 1700 showing logical components of an embodiment of DB API 1302 of FIG. 13. The logical components include DB API 1302, DB manager 1308, DB cache 1702, DB notification engine 1704, Structured Query Language (SQL)/ and not only SQL (NoSQL) adapter 1706, and other tasks in the process 1708. DB API 1302 has functional API interfaces with DB cache 1702, DB notification engine 1704, and other tasks in the process 1708. DB cache 1702 further has a function API interface with SQL/NoSQL adapter 1706 and operates as a cache for DB API 1302. DB notification engine 1704 has function API interfaces with DB cache 1702 and DB manager 1308 and performs notifications regarding changes to data for which an entity is subscribed. DB manager 1308 is configured to manage data moving between the persistent layer and in-memory data. SQL/NoSQL adapter 1706 is configured to provide an interface to a SQL and/or NoSQL database.

FIG. 18 illustrates a simplified block diagram 1800 showing logical components of an embodiment of message routing manager 1318 of FIG. 13. Message routing manager 1318 includes message router message handler 1802, message routing table 1804, inter-process communication (IPC) message parser 1806, event API 1808, and other tasks in the process 1810. Message router message handler 1802 has function API interfaces with message routing table 1804 and IPC message parser 1806 and is configured to handle messages received by message routing manager 1318 Message routing table 1804 maintains a table of location data regarding the physical location of nodes within the system so that even if a node moves in the system upper layer application services may be made aware of the change. IPC message parser has function API interfaces with message routing table 1804, message router message handler 1802, and event API 1808 and is configured to receive and parse messages into their component structure and pass the message to other elements within the system. Event API 1808 has a function API interface with IPC message parser 1806 and is configured to function as a programming interface for events within the network.

Note that in certain example implementations, the data abstraction functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, server 102 may include software in order to achieve the data abstraction functions outlined herein. These activities can be facilitated by network, service, and subscriber abstraction modules 104 (where these modules can be suitably combined in any appropriate manner, which may be based on particular configuration and/or provisioning needs). Server 102 can include memory elements for storing information to be used in achieving the data abstraction activities, as discussed herein. Additionally, server 102 may include a processor that can execute software or an algorithm to perform the data abstraction operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Moreover, the present disclosure is equally applicable to various technologies, aside from mobile architectures, as these have only been offered for purposes of discussion.

Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
   receiving, by a server, data from a network element;
   determining, by a data control task having a plurality of candidate data processing tasks associated therewith, a particular candidate data processing task of the plurality of candidate processing tasks for the received data based upon a first similarity metric representative of a measure of similarity between the received data and data currently associated with the particular candidate data processing task, wherein determining the particular candidate data processing task includes determining whether the first similarity metric is within a predetermined threshold; and
   sending the received data to the particular candidate data processing task, wherein the particular candidate data processing task is configured to determine whether the received data is suitable for the particular candidate data processing task based upon a second similarity metric between the received data and data currently associated with the particular candidate data processing task, wherein the second similarity metric is representative of a greater level of similarity analysis than the first similarity metric.

2. The method of claim 1, further comprising receiving an indication regarding whether the candidate data processing task has accepted the received data.

3. The method of claim 2, further comprising updating similarity information for the candidate data processing task based upon whether the candidate data processing task has accepted the received data.

4. The method of claim 2, further comprising determining a next candidate data processing task if the candidate data processing task indicates that the data processing task has not accepted the received data.

5. The method of claim 1, further comprising sending a message indicative of whether the candidate data processing task has accepted the received data based upon whether the received data is suitable for the data processing task.

6. The method of claim 1, further comprising processing the received data by the candidate data processing task according to at least one predefined rule.

7. Logic encoded in one or more non-transitory tangible media that includes code for execution and when executed by a processor operable to perform operations comprising:
   receiving, by a server, data from a network element;
   determining, by a data control task having a plurality of candidate data processing tasks associated therewith, a particular candidate data processing task of the plurality of candidate processing tasks for the received data based upon a first similarity metric representative of a measure of similarity between the received data and data currently associated with the particular candidate data processing task, wherein determining the particular candidate data processing task includes determining whether the first similarity metric is within a predetermined threshold; and
   sending the received data to the particular candidate data processing task, wherein the particular candidate data processing task is configured to determine whether the received data is suitable for the particular candidate data processing task based upon a second similarity metric between the received data and data currently associated with the particular candidate data processing task, wherein the second similarity metric is representative of a greater level of similarity analysis than the first similarity metric.

8. The media of claim 7, wherein the operations further comprise receiving an indication regarding whether the candidate data processing task has accepted the received data.

9. The media of claim 8, wherein the operations further comprise determining a next candidate data processing task if the candidate data processing task indicates that the data processing task has not accepted the received data.

10. The media of claim 8, wherein the operations further comprise updating similarity information for the candidate data processing task based upon whether the candidate data processing task has accepted the received data.

11. The media of claim 7, wherein the operations further comprise sending a message indicative of whether the candidate data processing task has accepted the received data based upon whether the received data is suitable for the data processing task.

12. The media of claim 7, wherein the operations further comprise processing the received data by the candidate data processing task according to at least one predefined rule.

13. An apparatus, comprising:
a memory element configured to store data,
a processor operable to execute instructions associated with the data, and
an abstraction module, the apparatus being configured to:
receive, by a server, data from a network element;
determine, by a data control task having a plurality of candidate data processing tasks associated therewith, a particular candidate data processing task of the plurality of candidate processing tasks for the received data based upon a first similarity metric representative of a measure of similarity between the received data and data currently associated with the particular candidate data processing task, wherein determining the particular candidate data processing task includes determining whether the first similarity metric is within a predetermined threshold; and
send the received data to the particular candidate data processing task, wherein the particular candidate data processing task is configured to determine whether the received data is suitable for the particular candidate data processing task based upon a second similarity metric between the received data and data currently associated with the particular candidate data processing task, wherein the second similarity metric is representative of a greater level of similarity analysis than the first similarity metric.

14. The apparatus of claim 13, wherein the apparatus is further configured to receive an indication regarding whether the candidate data processing task has accepted the received data.

15. The apparatus of claim 14, wherein the apparatus is further configured to update similarity information for the candidate data processing task based upon whether the candidate data processing task has accepted the received data.

16. The apparatus of claim 14, wherein the apparatus is further configured to determine a next candidate data processing task if the candidate data processing task indicates that the data processing task has not accepted the received data.

17. The apparatus of claim 13, wherein the apparatus is further configured to send a message indicative of whether the candidate data processing task has accepted the received data based upon whether the received data is suitable for the data processing task.

* * * * *